US012594782B2

(12) United States Patent
Harano et al.

(10) Patent No.: US 12,594,782 B2
(45) Date of Patent: Apr. 7, 2026

(54) RETRACTABLE WRITING UTENSIL

(71) Applicant: SAKURA COLOR PRODUCTS CORPORATION, Osaka (JP)

(72) Inventors: Toshiyuki Harano, Osaka (JP); Kohei Minami, Osaka (JP)

(73) Assignee: SAKURA COLOR PRODUCTS CORPORATION, Osaka (JP)

( * ) Notice: Subject to any disclaimer, the term of this patent is extended or adjusted under 35 U.S.C. 154(b) by 0 days.

(21) Appl. No.: 18/635,656

(22) Filed: Apr. 15, 2024

(65) Prior Publication Data

US 2024/0351363 A1 Oct. 24, 2024

(30) Foreign Application Priority Data

Apr. 21, 2023 (JP) ................................ 2023-070167
Mar. 27, 2024 (JP) ................................ 2024-052133

(51) Int. Cl.
*B43K 24/08* (2006.01)
*B43K 7/12* (2006.01)

(52) U.S. Cl.
CPC .............. *B43K 24/084* (2013.01); *B43K 7/12* (2013.01)

(58) Field of Classification Search
CPC ............................ B43K 24/084; B43K 25/028
See application file for complete search history.

(56) References Cited

U.S. PATENT DOCUMENTS

| | | | | |
|---|---|---|---|---|
| 4,991,988 A * | 2/1991 | Snell | B43K 24/084 401/109 |
| 5,871,296 A * | 2/1999 | Furukawa | B43K 7/08 401/214 |
| 6,280,110 B2 * | 8/2001 | Lin | B43K 24/08 401/111 |
| 7,972,072 B2 * | 7/2011 | Toyama | B43K 24/084 401/109 |
| 10,538,124 B2 * | 1/2020 | Ito | B43K 24/084 |
| 2018/0361781 A1 | 12/2018 | Ito | |

FOREIGN PATENT DOCUMENTS

WO 2017/104468 A1 6/2017

* cited by examiner

*Primary Examiner* — Erin Deery
*Assistant Examiner* — Bradley S Oliver
(74) *Attorney, Agent, or Firm* — Wood, Phillips, Katz, Clark & Mortimer

(57) ABSTRACT

The present disclosure provides a retractable writing utensil including: a barrel; a writing body; and a knocking member causing a portion of the writing body to protrude and retract from a front end of the barrel by knocking operation of pushing the knocking member forward. The retractable writing utensil includes an interlocking member interlocking with the knocking member, the interlocking member moves forward together with the knocking member by pushing the knocking member forward. The knocking member and the interlocking member are capable of a relative rotation to each other and engaged with each other in a state in which the relative rotation is restricted.

9 Claims, 17 Drawing Sheets

RETRACTABLE WRITING UTENSIL

FIELD OF THE INVENTION

The present disclosure relates to a retractable writing utensil whose pen tip protrudes and retracts.

BACKGROUND ART

Retractable writing utensils including a barrel, a writing body, and a knocking member have been widely known. In such retractable writing utensils, a state in which a tip portion of the writing body protrudes from a tip portion of the barrel and a state in which the tip portion of the writing body retracts in the barrel are switched by performing a knocking operation of pushing the knocking member provided on the tail end side in an axial direction of the barrel.

As such retractable writing utensils, a knocking type writing utensil disclosed in Patent Document 1 is known. The knocking type writing utensil of Patent Document 1 includes a knocking member with a clip, a cam member, a rotating member, and a resilient member. The knocking member and the cam member connect to each other, the cam member and the rotating member engage with each other, and the rotating member abuts on the rear end portion of the writing body. In addition, the resilient member constantly biases the writing body rearward.

As a result, when the knocking member is pushed forward from the state where the tip of the writing body is retracted in the barrel, the cam member moves forward together with the knocking member, and the rotating member rotates and moves forward by the forward movement of the cam member in the knocking type writing utensil of Patent Document 1. Consequently, the writing body moves forward, and the tip of the writing body protrudes from the tip portion of the barrel.

In addition, when the knocking member is pushed forward from a state where the tip of the writing body protrudes from the tip portion of the barrel and then the pushing is released, the writing body, the rotating member, and the cam member move rearward by the rearward biasing of the resilient member and the tip of the writing body retracts in the barrel in the knocking type writing utensil of Patent Document 1.

The knocking member and the cam member are in whirl-stop engagement with each other in the knocking type writing utensil of Patent Document 1. That is, the knocking member and the cam member engage with each other through an engagement structure that prevents the knocking member and the cam member from rotating relatively to each other.

Patent Document 1: WO2017/104468

According to the knocking type writing utensil in which the knocking member with the clip and the cam member are in the whirl-stop engagement with each other, it is possible to prevent an occurrence of a problem caused by the clip rotating about the axis of the barrel and being disposed at an undesirable position. For example, there are a problem that the clip rotates and covers a printed portion on the outer peripheral surface of the barrel, and a problem that the clip hits the hand at the time of writing, which becomes an obstacle.

In addition, when the knocking member and the cam member are in the whirl-stop engagement with each other, there is also an advantage that the knocking type writing utensil functions as a rolling stopper in a case where the knocking type writing utensil rolls on a desk.

Furthermore, since there are a certain number of users (consumers) who like the knocking type writing utensil that gives a sense of unity between the barrel and the clip, it is preferable to introduce the whirl-stop engagement structure in terms of providing the knocking type writing utensil supported by such users.

On the other hand, according to such a whirl-stop engagement structure, there has been a problem that the knocking member or the cam member is damaged because of a forcible rotation of the knocking member by the user.

Furthermore, according to the whirl-stop engagement structure, since a position of the clip with respect to the barrel is fixed, there is also a problem that user's fingers are placed on same positions of the barrel every time the user holds the knocking type writing utensil in a hand and uses it. That is, there is a problem that portions of the barrel that are touched by the user's fingers every time are quickly worn. In this case, when the user holds the knocking type writing utensil every time with the same positions of the barrel, a contact position of a pen tip portion (ballpoint pen tip etc.) of the knocking type writing utensil with a writing object (paper etc.) is the same every time. That is, there is also a problem that a specific position of the pen tip portion wears quickly.

As described above, the conventional structure in which the knocking member and the cam member are engaged with each other in the whirl-stop manner has the above-described various advantages and the above-described various problems, and whether or not to stop whirls of the knocking member and the cam member has been determined depending on a providing knocking type writing utensil. Therefore, there is a desire to solve the problem caused by the whirl-stop engagement while maintaining the advantage of whirl-stop of the knocking member and the cam member.

SUMMARY OF THE INVENTION

An object of the present disclosure is to provide a retractable writing utensil capable of suppressing an occurrence of a problem caused by a structure in which a knocking member is prevented from rotating and capable of exerting an effect similar to that of a structure in which the knocking member is prevented from rotating.

An aspect of the present disclosure provides a retractable writing utensil including: a barrel; a writing body; a knocking member that causes a portion of the writing body to protrude from or retract into a front end of the barrel with a knocking operation of pushing the knocking member forward; and an interlocking member that interlocks with the knocking member, the interlocking member moving forward together with the knocking member when the knocking member is pushed forward, wherein the knocking member and the interlocking member are engaged with each other in a state allowing a restricted relative rotation of the knocking member and the interlocking member relative to each other.

According to this aspect, the knocking member and the interlocking member are rotatable relatively to each other, and the occurrence of the problem that may arise when the knocking member is prevented from rotating can be suppressed. In addition, since the knocking member and the interlocking member engage with each other in a state where relative rotation is restricted, it is possible to suppress unintended positional displacement of the clip, and the like, similarly to the structure in which the knocking member is prevented from rotating.

A preferable aspect of the present disclosure provides the retractable writing utensil in which a portion of the knocking member and a portion of the interlocking member are intermittently in contact with each other in a circumferential direction of the barrel.

A preferable aspect of the present disclosure provides the retractable writing utensil in which contact portions between the knocking member and the interlocking member that are located at a plurality of positions separated from each other in the circumferential direction of the barrel are configured to be a point contact or a line contact.

According to these aspects, the knocking member and the interlocking member can engage with each other with a simple structure in a state in which the relative rotation is restricted while being in a state in which the relative rotation is possible.

A preferable aspect of the present disclosure provides the retractable writing utensil in which a required rotational torque for the relative rotation is 1.0 N·cm (newton centimeter) or more and 17.0 N·cm or less.

According to this aspect, the knocking member and the interlocking member do not rotate relatively to each other with a force of less than 1.0 N·cm. That is, the knocking member and the interlocking member do not rotate relatively to each other unless a person intentionally applies a certain force or more, and the knocking member and the interlocking member do not rotate relatively to each other to such extent as a light force causing a rolling of a knocking type writing utensil on a desk is applied.

Therefore, it is possible to more reliably obtain the same effect as the structure in which the knocking member is prevented from rotating, and it is possible to suppress the occurrence of the problem that may arise when the knocking member is prevented from rotating.

A preferable aspect of the present disclosure provides the retractable writing utensil in which the interlocking member includes a protruding part, the knocking member includes an interlocking member inserting part that allows a portion of the interlocking member inclusive of the protruding part to be inserted, at least a portion of the interlocking member inserting part is configured to have an inner peripheral surface with a substantially polygonal shape in a cross section, the protruding part is intermittently in contact with the inner peripheral surface of the interlocking member inserting part in a circumferential direction of the barrel, and a contact portion between the protruding part and the inner peripheral surface of the interlocking member inserting part is configured to be a point contact or a line contact.

Note that the term "substantially polygonal shape" as used herein is not limited to a strict polygonal shape, and may be a triangular shape, a quadrangular shape, a pentagonal shape, . . . having a plurality of linear portions and a plurality of corner portions, and, for example, the linear portion is not limited to a strict straight line and may partially have a curved portion or a bent portion. That is, the linear portion may be straight as a whole. The corner portion also include rounded corners, i.e., rounded off or chamfered shapes.

According to this aspect, the knocking member and the interlocking member can engage with each other with a simple structure in the state in which the relative rotation is restricted while being in the state in which relative rotation is possible.

A preferable aspect of the present disclosure provides the retractable writing utensil in which the knocking member and the interlocking member are rotatable in a circumferential direction of the barrel relatively to each other, and the knocking member and the interlocking member are rotatable by 360 degrees in the circumferential direction of the barrel relatively to each other.

According to this aspect, since the barrel is not broken when the knocking member is pulled with a strong strength, the writing utensil does not get a fatal damage. Therefore, it is possible to restore the writing utensil afterwards.

A preferable aspect of the present disclosure provides the retractable writing utensil in which the writing utensil includes a pressing member between the interlocking member and the writing body, the pressing member including the pressing side engagement portion configured to engage with the barrel to retain a state where the writing body protrudes from the barrel, the knocking member is configured to be difficult to detach from the interlocking member, the interlocking member is configured to be difficult to detach from the pressing member, the pressing member is configured to engage with the barrel to make it difficult for the pressing member to detach from the barrel, and when the knocking member is attempted to be pulled out from the barrel with an excessive force, the interlocking member is detached from the pressing member.

According to this aspect, a damage to the member caused by user's forcible turn of the knocking member can be more certainly suppressed.

According to the present disclosure, it is possible to provide the retractable writing utensil capable of suppressing the occurrence of the problem caused by the structure in which the knocking member is prevented from rotating as well as capable of exhibiting the effect similar to the structure in which the knocking member is prevented from rotating.

DETAILED DESCRIPTION OF THE PREFERRED EMBODIMENTS

Hereinafter, embodiments of the present disclosure will be described. In the following description, the relationship of "front and rear" will be described with the pen tip side as the front side and the tail end side as the end opposite to the pen tip as the rear side.

Figure 1:
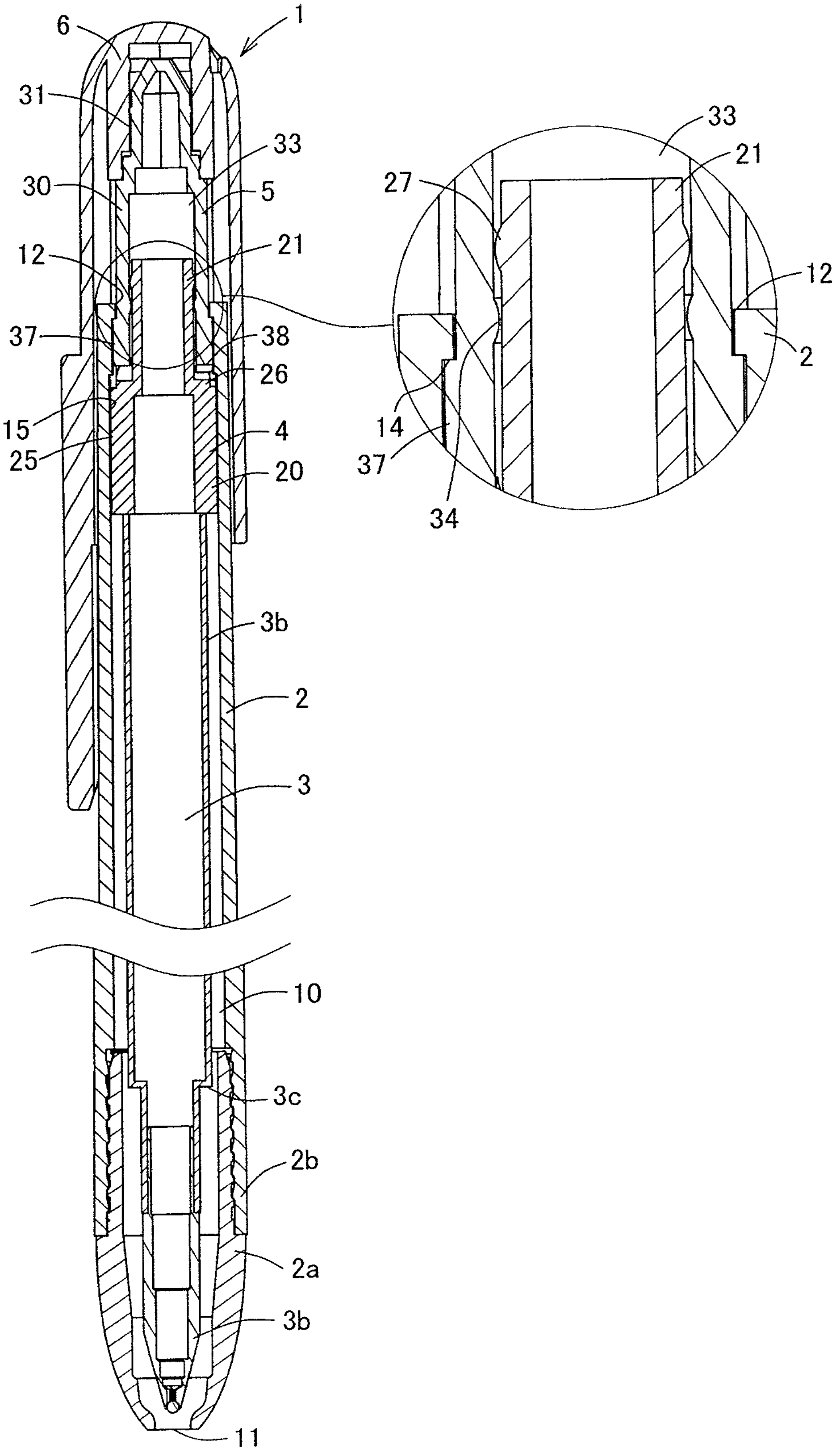
FIG. 1 is a cross-sectional view illustrating a writing utensil according to a first embodiment.
Figure 2:
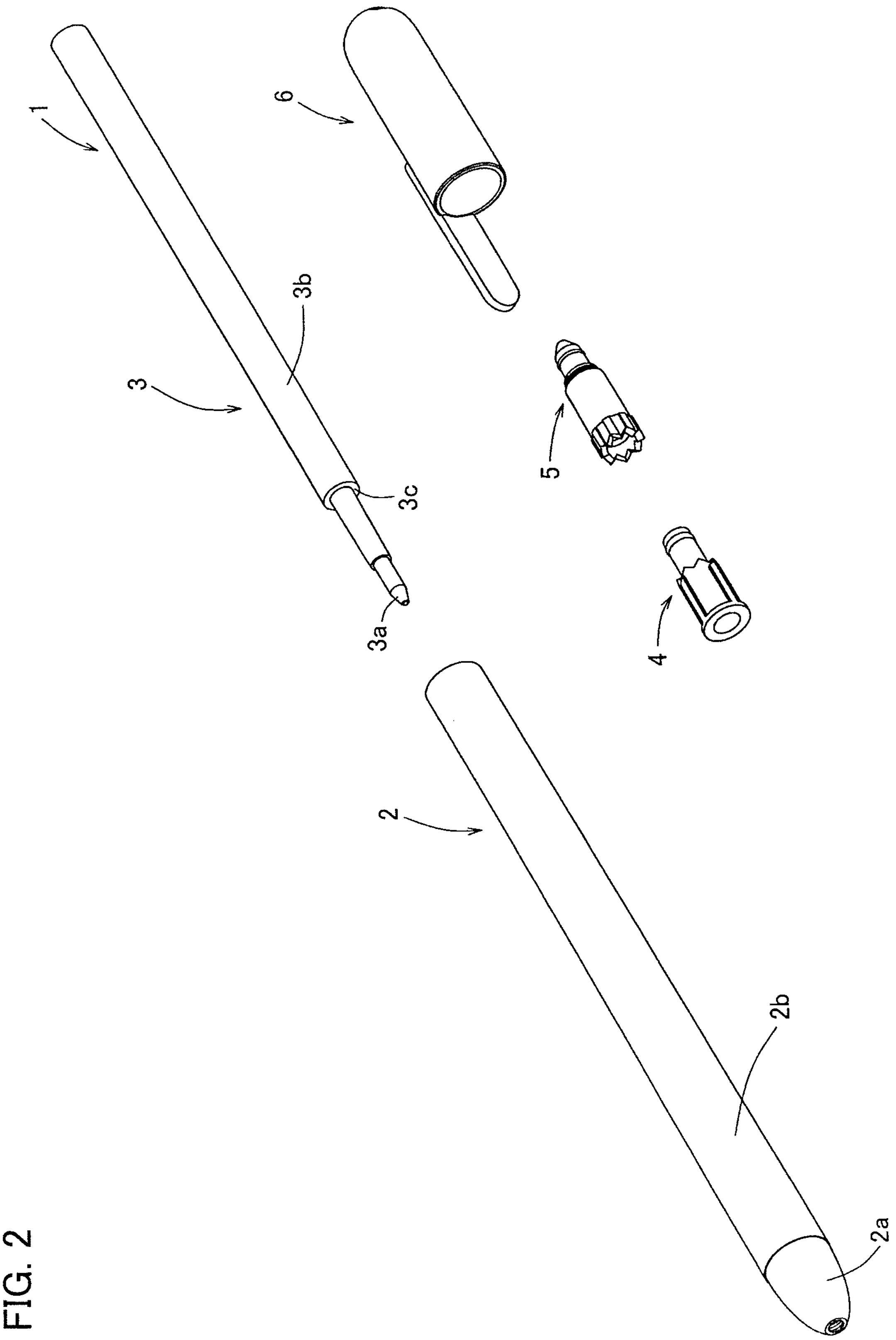
FIG. 2 is an exploded perspective view illustrating the writing utensil in FIG. 1.

As illustrated in FIGS. 1 and 2, a writing utensil 1 (retractable writing utensil) according to a first embodiment of the present disclosure includes a barrel 2, a core member 3 (writing body), a pressing member 4, an interlocking member 5, a knocking member 6, and an elastic member (not illustrated). The elastic member is a member that is accommodated in the barrel 2 and constantly presses the core member 3 rearward, and a coil spring is adopted as the elastic member in the present embodiment.

The barrel 2 includes a front side forming part 2*a* and a rear side forming part 2*b*, and connects the front side forming part 2*a* and the rear side forming part 2*b* in the front-rear direction (axial direction of the writing utensil 1).

As illustrated in FIG. 1, the barrel 2 has a barrel inner space 10 that is an inner space capable of accommodating the main members of the writing utensil 1 therein. The barrel 2 has a front side opening part 11 that communicates the barrel inner space 10 with outside at its front side. In addition, the barrel 2 has a rear side opening part 12 that communicates the barrel inner space 10 with the outside at its rear side.

Figure 3:
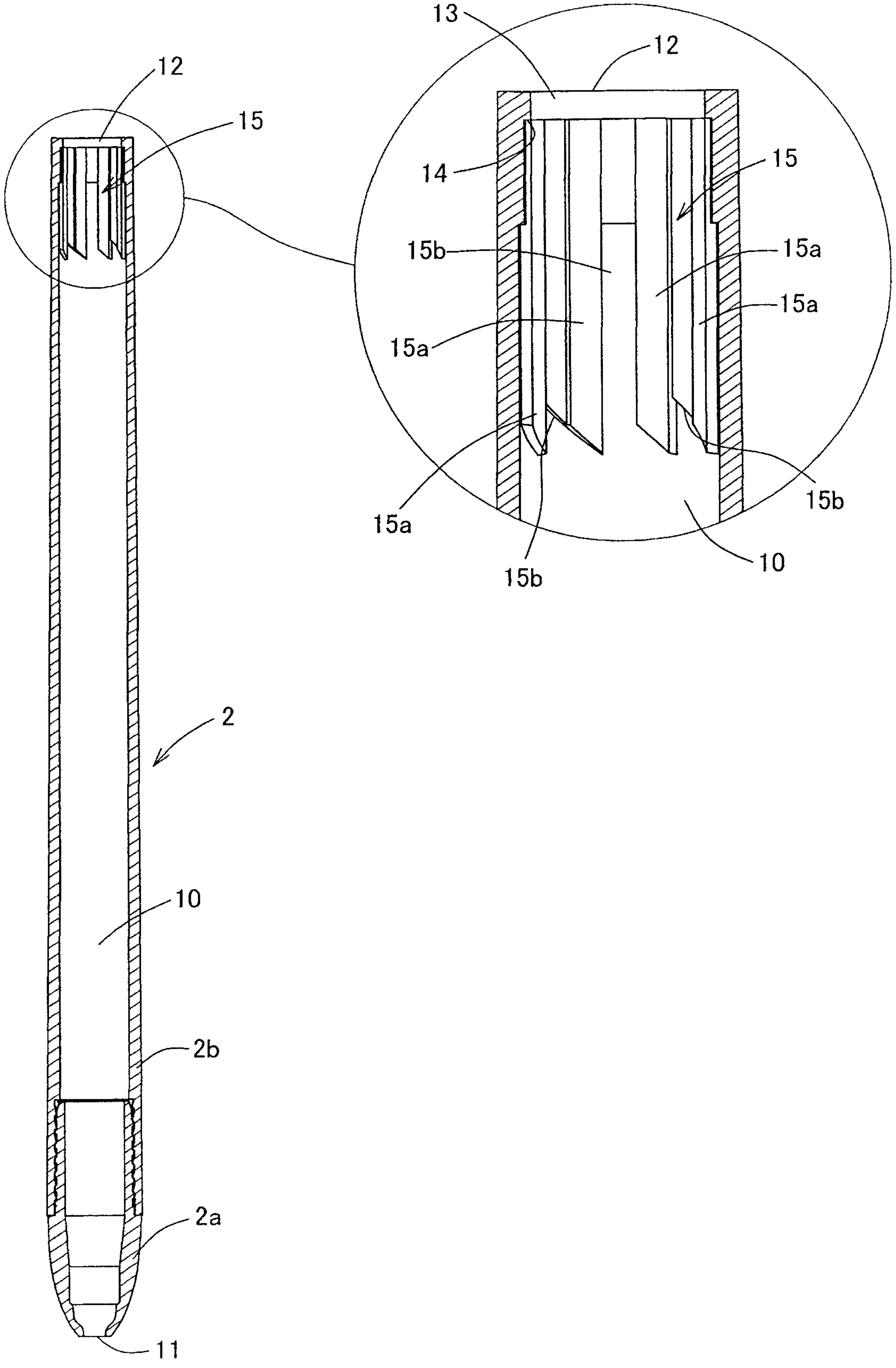
FIG. 3 is a cross-sectional view illustrating a barrel in FIG. 1.

As illustrated in FIG. 3, the barrel 2 of the present embodiment has a narrow diameter part 13 at the rear end side portion. The narrow diameter part 13 is formed so that the thickness of the peripheral wall is larger than the thickness of a peripheral wall of a portion adjacent to front side of the narrow diameter part 13, and is formed to have a smaller diameter than the portion adjacent to the front side of the narrow diameter part 13. In addition, the narrow diameter part 13 of the present embodiment is formed at a position adjacent to the front of the rear side opening part 12. Accordingly, in the barrel 2 of the present embodiment, a stepped part 14 is formed at a boundary portion between the narrow diameter part 13 and a portion adjacent to the front side of the narrow diameter part 13.

As illustrated in FIG. 3, the barrel 2 of the present embodiment is provided with a barrel side engagement portion 15 therein. The barrel side engagement portion 15 includes a plurality of barrel side engagement protruding parts 15*a* (protruding ridge parts) and a plurality of barrel side engagement groove parts 15*b*, and the barrel side engagement protruding parts 15*a* and the barrel side engagement groove parts 15*b* are alternately arranged in a circumferential direction of an inner peripheral surface of the barrel 2 (a direction around an axis of the barrel 2). The barrel side engagement portion 15 is an engagement portion that engages with a pressing side engagement portion 25 (see FIG. 4A etc.) and an interlocking side engagement portion 37 (see FIG. 6A etc.) to be described later.

As illustrated in FIGS. 1 and 2, the core member 3 includes a pen tip part 3*a* and a core part 3*b*.

The pen tip part 3*a* is a portion that comes into contact with a writing object such as paper when writing with the writing utensil 1, and the core part 3*b* is a portion that is elongated in the front-rear direction behind the pen tip part 3*a*.

Here, a ballpoint pen refill is adopted as the core member 3 in the present embodiment. That is, the pen tip part 3*a* of the present embodiment is a ballpoint pen tip having a ball held rotatably, and the core part 3*b* is an ink storage pipe (coating liquid storage part) that stores ink (coating liquid). The core part 3*b* has a core side stepped part 3*c* which is a stepped portion on a portion of an outer peripheral surface. The core side stepped part 3*c* is a portion pressed by the above described elastic member (not illustrated).

Figure 4A:
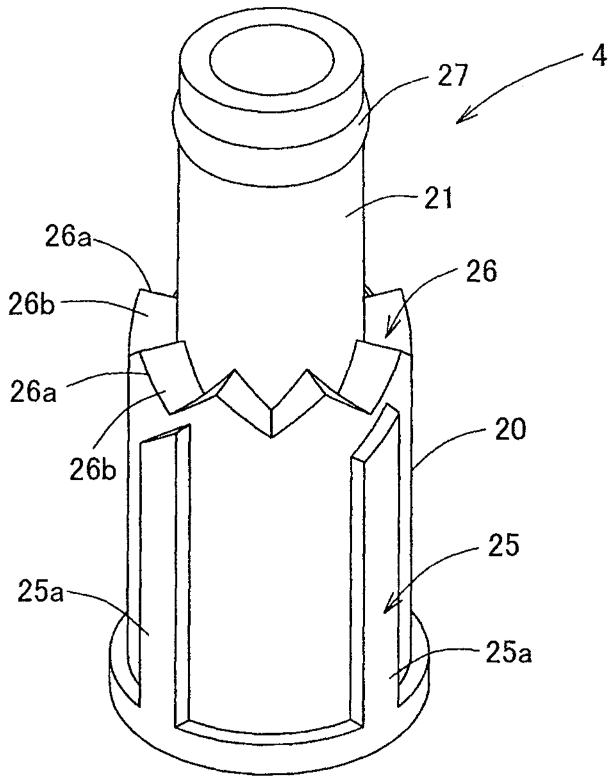
FIG. 4A is a perspective view illustrating a pressing member in FIG. 1.
Figure 4B:
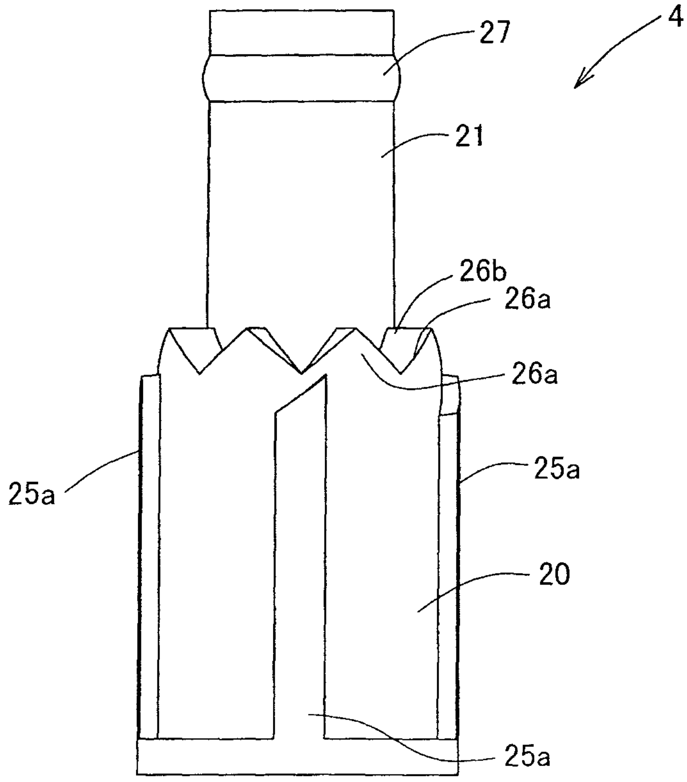
FIG. 4B is a side view illustrating the pressing member in FIG. 1.

As illustrated in FIG. 4A, the pressing member 4 includes a pressing member main body part 20 constituting a front side portion (lower side portion in FIG. 4A) and a pressing member extending part 21 constituting a rear side portion, and is a member formed by integrating the pressing member main body part 20 and the pressing member extending part 21. That is, the pressing member 4 is a resin member molded integral with each part by an appropriate molding means such as injection molding. In other words, each part of the pressing member 4 is integrated as one member and cannot be separated in a non-destructive manner.

The pressing member extending part 21 extends rearward from the rear side portion of the pressing member main body part 20. That is, an extending direction of the pressing member extending part 21 is the same direction as the front-rear direction.

The pressing member main body part 20 and the pressing member extending part 21 are cylindrical members having different thicknesses (sizes of diameters), and the pressing member main body part 20 is formed to be thicker than the pressing member extending part 21.

Furthermore, the pressing member 4 includes the pressing side engagement portion 25, a pressing side cam part 26, and a pressing side locking protruding part 27.

The pressing side engagement portion 25 includes a plurality of engagement protruding parts 25*a* protruding (projecting) outward from the outer peripheral surface of the pressing member main body part 20. As described above, the pressing side engagement portion 25 is an engagement portion that engages with the barrel side engagement portion 15.

The pressing side cam part 26 is formed at a rear end portion of the pressing member main body part 20, and has a protrusion 26*a* that protrudes rearward and a recess 26*b* formed between the two protrusions 26*a*. The pressing side cam part 26 is a portion where the protrusion 26*a* and the recess 26*b* are alternately arranged in the circumferential direction of the barrel 2 (is also the circumferential direction of the outer peripheral surfaces of the pressing member main body part 20 and the pressing member extending part 21). The pressing side cam part 26 is continuously formed in an annular shape in the circumferential direction of the barrel 2 so as to surround the front side portion of the pressing member extending part 21. For convenience of drawing, only some of the protrusions 26*a* and the recesses 26*b* are denoted by reference numerals, and the other reference numerals are omitted. In addition, in a case where there is a plurality of similar components, reference numerals are omitted as necessity in the following description.

The pressing side locking protruding part 27 is formed on the rear side of the pressing member extending part 21, i.e., at a position on the rear side of the center of the pressing member extending part 21 in the front-rear direction. In the present embodiment, the pressing side locking protruding part 27 is formed at a position slightly away forward from the rear end of the pressing member extending part 21.

Note that the pressing side locking protruding part 27 is a portion that protrudes (projects) outward from the outer peripheral surface of the pressing member extending part 21, and is a protruding portion that continues annularly (circularly) in the circumferential direction of the outer peripheral surface of the pressing member extending part 21 (the circumferential direction of the barrel 2). The pressing side locking protruding part 27 of the present embodiment is a projection having a rounded shape without a corner.

Figure 5:
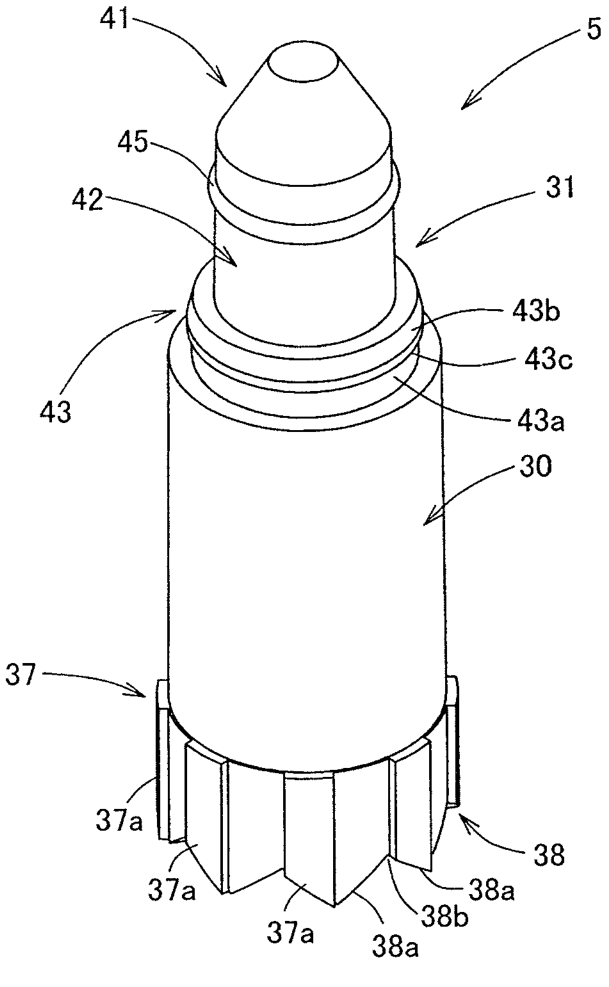
FIG. 5 is a perspective view illustrating an interlocking member in FIG. 1.
Figure 6A:
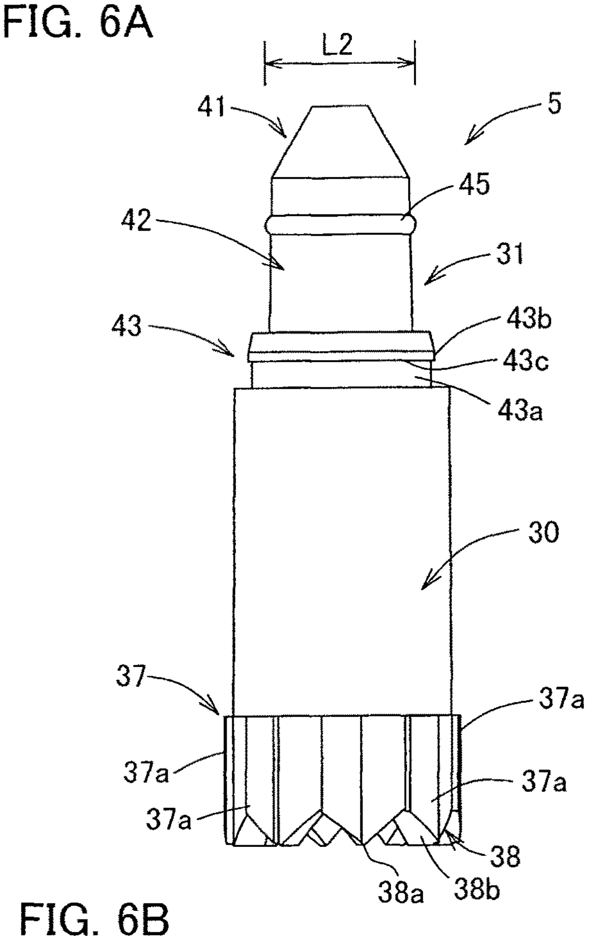
FIG. 6A is a side view illustrating the interlocking member in FIG. 5.
Figure 6B:
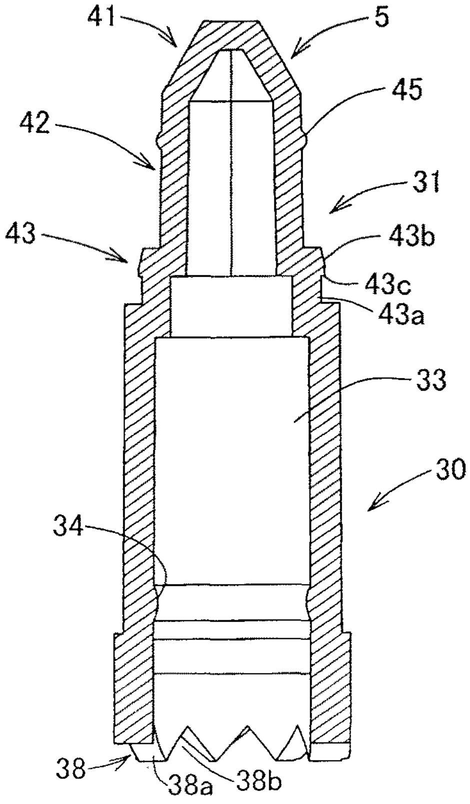
FIG. 6B is a cross-sectional view illustrating the interlocking member in FIG. 5.

As illustrated in FIGS. 5, 6A and 6B, the interlocking member 5 includes a pressing material connecting part 30 constituting a front side portion (a lower side portion in FIG. 5) and a knocking member mounting part 31 constituting a rear side portion (an upper side portion in FIG. 5), and these are integrally formed.

That is, the interlocking member 5 is also the resin member molded integral with each part by the appropriate molding means such as the injection molding. In other words, each part of the interlocking member 5 is integrated as one member and cannot be separated in a non-destructive manner.

The pressing material connecting part 30 is a cylindrical (tubular) portion and has an inner side locking protruding part 34 therein as illustrated in FIG. 6B. The inner side locking protruding part 34 is a portion protruding (projecting) inward from the inner peripheral surface of the pressing material connecting part 30, and is a protruding part annularly (circularly) continuous in the circumferential direction of the inner peripheral surface (the circumferential direction of the barrel 2). That is, the inner side locking protruding part 34 is disposed in the internal space of the pressing material connecting part 30. The inner side locking protruding part 34 of the present embodiment is a projection having a rounded shape without a corner.

In the present embodiment, the knocking member mounting part 31 is also a hollow portion having an internal space. The internal space of the pressing material connecting part 30 and the internal space of the knocking member mounting part 31 are continuous spaces.

That is, the interlocking member 5 is a hollow member, and has the pressing member inserting part 33 into which a portion of the pressing member 4 (at least a portion of the pressing member extending part 21) can be inserted as the internal space. The pressing member inserting part 33 of the present embodiment is a space having a substantially circular cross-sectional shape and extending in the front-rear direction.

Furthermore, a space formed so as to reduce the area of the cross section is located behind (above in FIG. 6B) the pressing member inserting part 33.

More specifically, the space located behind the pressing member inserting part 33 includes a first space located inside a portion of the pressing material connecting part 30 and the knocking member engagement portion 43 (to be described in detail later), a second space located inside a portion of the knocking member engagement portion 43 (to be described in detail later) and the intermediate extending part 42, and a third space located inside the inserting direction tip part 41. The first space, the second space, and the third space are spaces continuous in the front-rear direction. The first space is a space having a substantially circular cross-sectional shape and extending in the front-rear direction (detailed illustration is omitted). The second space is a space having a cross-sectional shape that is substantially polygonal (substantially hexagonal) and extending in the front-rear direction, and is a space having a cross-sectional area smaller than the cross-sectional area of the first space. Furthermore, the third space is a space in which the cross-sectional shape of each part is a substantially polygonal shape (substantially hexagonal shape), and the area of the cross section decreases toward the rear.

The interlocking member 5 includes the interlocking side engagement portion 37 and an interlocking side cam part 38.

As illustrated in FIGS. 5 and 6A, the interlocking side engagement portion 37 includes a plurality of engagement protruding parts 37*a*, and each of the engagement protruding parts 37*a* protrudes (projects) outward from the outer peripheral surface on the front end side of the pressing material connecting part 30. The interlocking side engagement portion 37 is also an engagement portion that engages with the barrel side engagement portion 15 described above.

As illustrated in FIGS. 5 and 6A, the interlocking side cam part 38 is formed at a front end portion (lower end portion in FIGS. 5 and 6A) of the pressing material connecting part 30, and has a protrusion 38*a* protruding forward and a recess 38*b* formed between the two protrusions 38*a*. The interlocking side cam part 38 is a portion where the protrusion 38*a* and the recess 38*b* are alternately arranged in the circumferential direction of the barrel 2 (which is also the circumferential direction of the outer peripheral surface of the pressing material connecting part 30).

As illustrated in FIG. 5, the knocking member mounting part 31 is a portion formed to be thinner than the pressing material connecting part 30, and includes an inserting direction tip part 41, an intermediate extending part 42, and a knocking member engagement portion 43 in order from the rear side.

The inserting direction tip part 41 is a rear end side portion of the knocking member mounting part 31, and has a substantially truncated conical outer shape. That is, the inserting direction tip part 41 has a tapered portion that narrows (reduces in diameter) toward the rear end side.

The intermediate extending part 42 has a substantially columnar outer shape, and is a portion extending in the front-rear direction between the inserting direction tip part 41 and the knocking member engagement portion 43. In the present embodiment, the front end portion (the lower end portion in FIG. 6A) of the inserting direction tip part 41 and the intermediate extending part 42 are formed to have the same thickness (the same diameter).

Here, the intermediate extending part 42 is provided with a rotation restricting protruding part 45 (protruding part) which is a characteristic portion of the present embodiment.

The rotation restricting protruding part 45 is a protruding portion that protrudes (projects) outward from the outer peripheral surface of the intermediate extending part 42, and is a protruding portion that continues annularly (circularly) in the circumferential direction (the circumferential direction of the barrel 2) of the outer peripheral surface of the intermediate extending part 42. Here, the rotation restricting protruding part 45 is a projection having a rounded shape without a corner. That is, as illustrated in FIG. 6B etc., the outer surface of the rotation restricting protruding part 45 is an arc-shaped surface.

Specifically, in the rotation restricting protruding part 45, a top portion protruding to the outermost side is located at a middle portion (near the center) in the front-rear direction, and the protruding amount gradually decreases from the top portion toward the upper side, and the protruding amount gradually decreases from the top portion toward the lower side. In portions of the outer peripheral surface of the intermediate extending part 42 where positions in the circumferential direction are the same, an arcuate surface is formed in portions from the upper end to the lower end through the top portion, and has a rounded shape.

As illustrated in FIG. 6A, the knocking member engagement portion 43 is a front end side portion (a lower end side portion in FIG. 6A) of the knocking member mounting part 31, and is thicker than the inserting direction tip part 41 and the intermediate extending part 42.

Specifically, the knocking member engagement portion 43 includes a front side thin part 43*a* positioned on the front side and having a substantially columnar outer shape, a rear side thick part 43*b* adjacent to the rear side, and a stepped part 43*c* at a boundary portion between the front side thin part 43*a* and the rear side thick part 43*b*. In addition, the rear side thick part 43*b* has a tapered portion (tapered surface portion) that becomes thicker (increases in diameter) toward the front.

Figure 7:
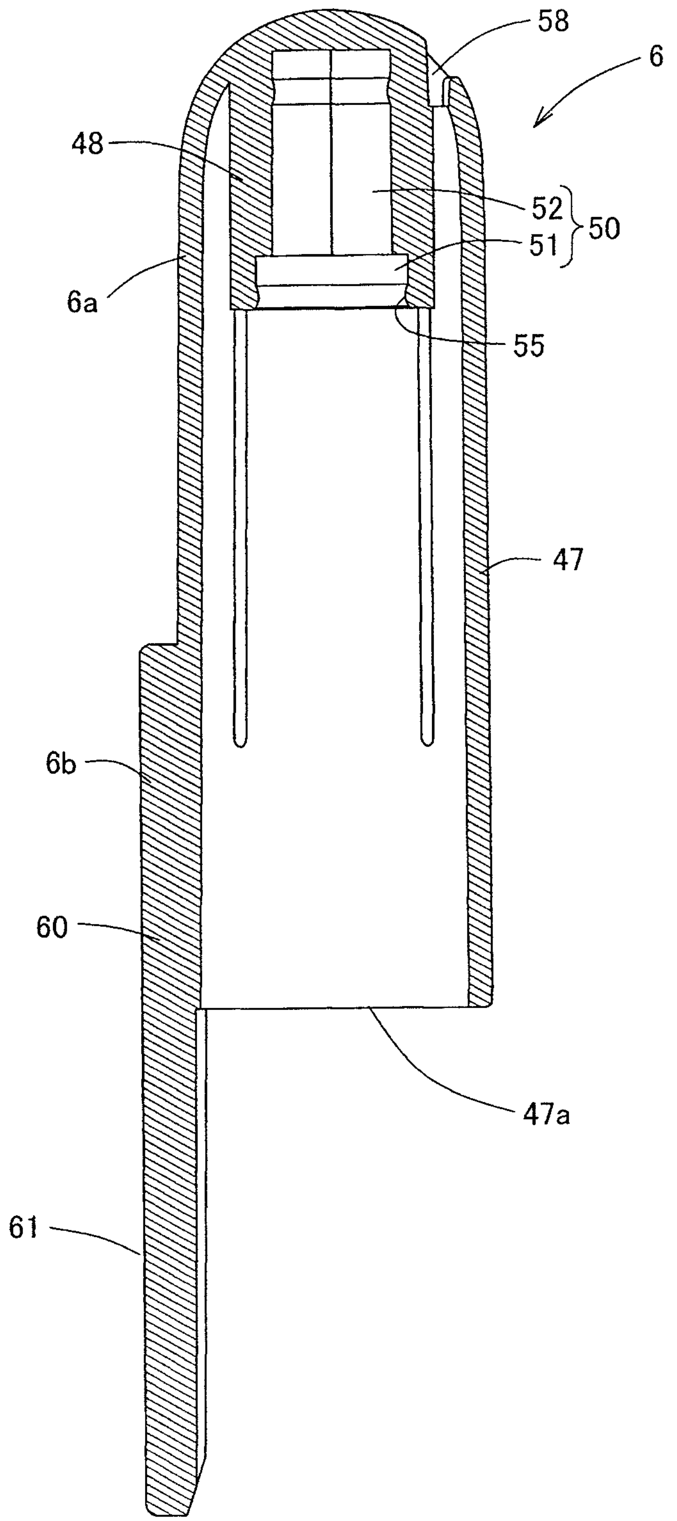
FIG. 7 is a cross-sectional view illustrating a knocking member in FIG. 1.
Figure 8A:
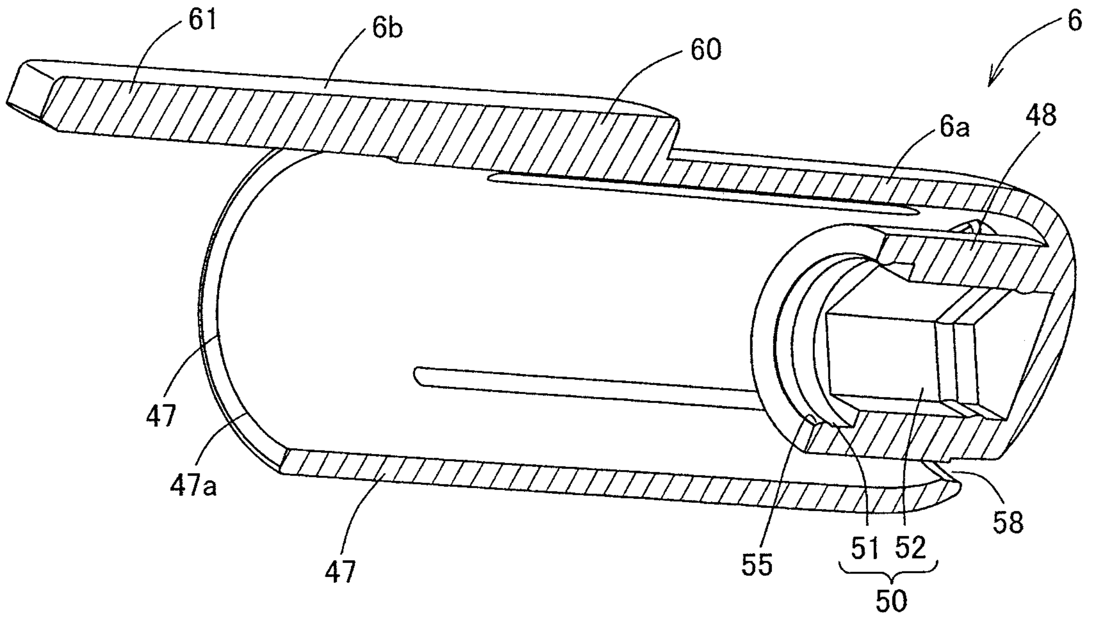
FIG. 8A is a cross-sectional perspective view illustrating the knocking member in FIG. 7.
Figure 8B:
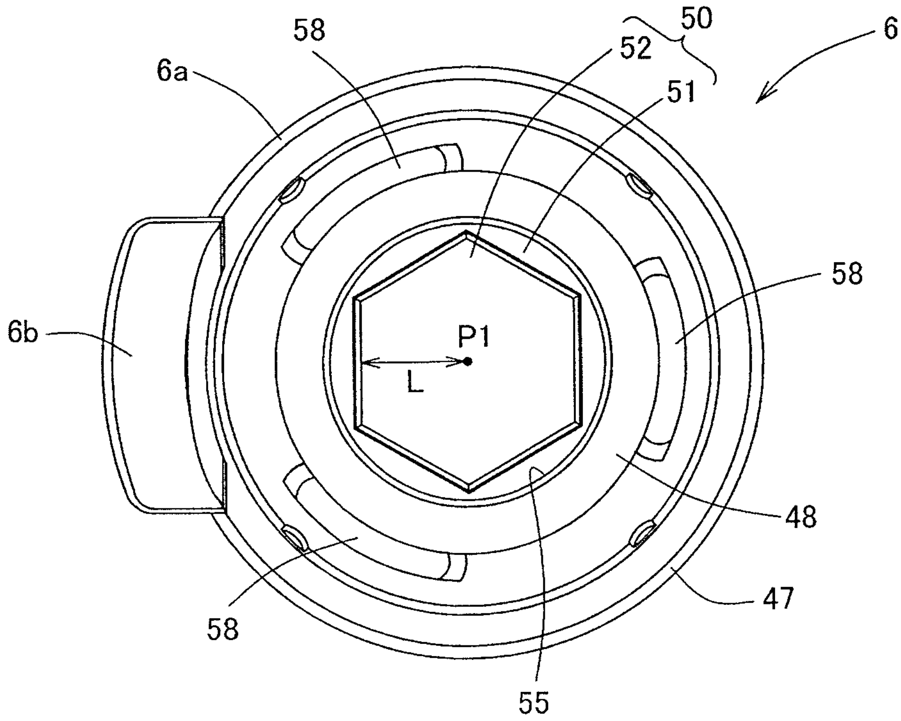
FIG. 8B is a plan view of the knocking member in FIG. 7 as viewed from the front side with the line-of-sight direction as a front-rear direction.

As illustrated in FIGS. 7, 8A, and 8B, the knocking member 6 includes a knocking member main body part 6*a* and a clip part 6*b*. The knocking member 6 is also the resin member molded integral with each part by the appropriate molding means such as the injection molding. In other words, each part of the knocking member 6 is integrated as one member and cannot be separated in a non-destructive manner.

The knocking member main body part 6*a* includes an outer cylinder part 47 and an inner cylindrical portion 48, and the outer cylinder part 47 and the inner cylindrical portion 48 form a double cylinder structure.

As illustrated in FIG. 7, the outer cylinder part 47 has an outer cylinder front opening part 47*a* on the front side (the lower side in FIG. 7), and the outer cylinder front opening part 47*a* is an opening part that communicates the inside and the outside. That is, the outer cylinder part 47 is a substantially bottomed cylindrical portion that has an opening portion on the front side while a most portion on the rear end side is closed, and has a space therein. Note that the outer shape of the rear end side portion (the upper end side portion in FIG. 7) of the outer cylinder part 47 is hemispherical (substantially hemispherical), and the rear side portion is also recessed rearward inside the outer cylinder part 47.

The inner cylindrical portion 48 is also a bottomed cylindrical portion whose rear end side is closed. The entire inner cylindrical portion 48 of the present embodiment is accommodated in the outer cylinder part 47. The opening portion on the front side of the inner cylindrical portion 48 is disposed at a position rearward of the outer cylinder front opening part 47*a* in the front-rear direction.

The inner cylindrical portion 48 includes an interlocking member inserting part 50 as an internal space into which at least a portion of the interlocking member 5 is inserted. The interlocking member inserting part 50 is a space extending in the front-rear direction, and includes a front side space part 51 which is a front side portion and a rear side space part 52 adjacent to the rear side of the front side space part 51, which are continuously formed in the front-rear direction.

As illustrated in FIGS. 7 and 8A, the front side space part 51 is formed so that an area of a cross section of each portion is larger than an area of a cross section of each portion of the rear side space part 52. That is, the inner peripheral surface of the inner cylindrical portion 48 surrounding the front side space part 51 is positioned outside the inner peripheral surface of the inner cylindrical portion 48 surrounding the rear side space part 52 in a widening direction of the cross section (the radial direction of the inner cylindrical portion 48). In other words, the rear side space part 52 is a space formed to be thinner than the front side space part 51 and extending in the front-rear direction.

In the present embodiment, as illustrated in FIG. 8A, the front side space part 51 is a space in which the shape of the cross section extends in a circular shape (substantially circular shape), and the rear side space part 52 is a space in which the shape of the cross section extends in a polygonal shape (substantially polygonal shape). Specifically, the rear side space part 52 of the present embodiment is a space having a cross-sectional shape extending in a hexagonal shape (substantially hexagonal shape).

Therefore, in a plan view with the front-rear direction as the line-of-sight direction, the inner peripheral surface of the inner cylindrical portion 48 surrounding the rear side space part 52 has a hexagonal shape (substantially polygonal shape and substantially hexagonal shape), and has a corner portion formed by a plurality of linear portions (six linear portions) and two adjacent linear portions. In other words, the inner peripheral surface of the inner cylindrical portion 48 has a corner portion formed by a plurality of surface portions and two adjacent surface portions.

As illustrated in FIGS. 7 and 8A, a knocking side locking protruding part 55 is formed on the inner peripheral surface of the front end side portion of the inner cylindrical portion 48, i.e., the inner peripheral surface surrounding the front side space part 51. The knocking side locking protruding part 55 is a portion that protrudes (projects) inward from the inner peripheral surface of the inner cylindrical portion 48, and is a protruding part that annularly (circularly) continues in the circumferential direction of the inner peripheral surface (the circumferential direction of the barrel 2). The knocking side locking protruding part 55 is a projection having a rounded shape without a corner.

As illustrated in FIGS. 7, 8A and 8B, the knocking member main body part 6*a* of the present embodiment has a communication hole part 58. The communication hole part 58 is a through hole that allows the inside and the outside of the knocking member main body part 6*a* to communicate with each other, and specifically, the communication hole part communicates between the outside and a space located between the outer peripheral surface of the inner cylindrical portion 48 and the inner peripheral surface of the outer cylinder part 47. In the present embodiment, the knocking member main body part 6*a* has a plurality of communication hole parts 58, and as illustrated in FIG. 8B, the inner cylindrical portion 48 is located inside the plurality of communication hole parts 58 (radially inside of outer cylinder part 47 and inner cylindrical portion 48) in a plan view seen from the front side. Here, the radially inner side of the outer cylinder part 47 and the inner cylindrical portion 48 is also the inner side in the widening direction of the cross section.

As illustrated in FIGS. 7 and 8A, the clip part 6*b* is formed by integrating a clip base end part 60 and a clip main body part 61. The clip base end part 60 is a portion continuous with the front end side portion of the outer peripheral surface of the outer cylinder part 47, and the clip main body part 61 is a plate-like portion extending forward from the clip base end part 60.

That is, the clip part 6*b* is formed integrally with the outer cylinder part 47, and extends forward in a cantilever manner from the outer peripheral surface of the outer cylinder part 47. In a state where the writing utensil 1 is assembled (see FIG. 1), since a gap is formed between the clip part 6*b* and the outer peripheral surface of the barrel 2, an object to be clamped (e.g., a part of a notebook, a cloth forming a pocket of a shirt) can be sandwiched between the clip part 6*b* and the barrel 2.

Next, a relationship between the respective members in a state where the writing utensil 1 is assembled will be described.

In the writing utensil 1 of the present embodiment, as illustrated in FIG. 1, the pressing member 4 and the interlocking member 5 are connected, and the knocking member 6 is attached to the interlocking member 5 (the interlocking member 5 and the knocking member 6 engage with each other). In other words, the knocking member 6 is attached to the pressing member 4 via the interlocking member 5.

At this time, the pressing member extending part 21 of the pressing member 4 is inserted into the pressing member inserting part 33 of the interlocking member 5 from the front side. In addition, the interlocking side cam part 38 of the interlocking member 5 and the pressing side cam part 26 of the pressing member 4 engage with each other.

Furthermore, in the pressing member inserting part 33, the pressing side locking protruding part 27 is disposed above the inner side locking protruding part 34. Here, the inner side locking protruding part 34 and the pressing side locking protruding part 27 are portions that function as a retaining means (first movement restricting means). That is, when the interlocking member 5 is moved relatively to the pressing member 4 in a direction of releasing the connection at the time of disassembling or the like of the writing utensil 1, the inner side locking protruding part 34 abuts on the pressing side locking protruding part 27 to prevent the movement. On the other hand, when the relative movement is intentionally performed by applying a certain force or more, the inner side locking protruding part 34 crosses over the pressing side locking protruding part 27 and the connection is released.

In the present embodiment, the interlocking side engagement portion 37 (see FIG. 5) of the interlocking member 5 and the pressing side engagement portion 25 (see FIG. 4A) of the pressing member 4 engage with the barrel side engagement portion 15 (see FIG. 3) of the barrel 2, respectively.

Here, the writing utensil 1 of the present embodiment is a retractable writing utensil capable of switching between a retracted state (see FIG. 1) in which the pen tip part 3*a* is retracted into the barrel 2 and a writing state (not illustrated) in which a portion of the pen tip part 3*a* protrudes to the outside from the front side opening part 11 of the barrel 2.

When switching from the retracted state to the writing state, a knocking operation of pushing the knocking member 6 toward to the front side is performed. When the knocking member 6 moves forward by the knocking operation, the knocking member 6 presses the interlocking member 5 to move the interlocking member 5 forward. At this time, as described above, since the interlocking side engagement portion 37 (see FIG. 5) of the interlocking member 5 and the barrel side engagement portion 15 (see FIG. 3) of the barrel 2 engage with each other, the interlocking member 5 slides forward in a state where the rotation of the interlocking member 5 about the axis of the barrel 2 is restricted. That is, the interlocking side engagement portion 37 and the barrel side engagement portion 15 function as a movement restricting means (second movement restricting means) that restricts a rotational movement of the interlocking member 5.

When the interlocking member 5 moves forward, the pressing member 4 is pressed by the interlocking member 5 and moves forward. At this time, as described above, since the pressing side engagement portion 25 (see FIG. 4A) of the pressing member 4 and the barrel side engagement portion 15 (see FIG. 3) of the barrel 2 engage with each other, the pressing member 4 slides forward in a state where the rotation of the pressing member 4 around the axis of the barrel 2 is restricted. Then, since the front side portion of the pressing member 4 abuts on the rear end portion of the core member 3 from the rear side, the pressing member 4 presses the core member 3 forward as the pressing member 4 moves forward, and the core member 3 moves forward.

Subsequently, when the interlocking member 5 and the pressing member 4 move forward by a certain amount or more, the rotation restriction by the pressing side engagement portion 25 and the barrel side engagement portion 15 is released. Furthermore, the contact positions of the interlocking side cam parts 38 and the pressing side cam parts 26 in contact with each other change, and the pressing member 4 rotates around the axis of the barrel 2. Then, the engagement position between the pressing side engagement portion 25 and the barrel side engagement portion 15 changes, and the transition to the writing state is completed.

That is, in the writing state, the pressing member 4 engages with a portion on the more front side of the barrel 2 as compared with the retracted state. As a result, the front portion of the pressing member 4 is disposed in a portion on the more front side (tip side) in the barrel 2, and this state is maintained. Then, the core member 3 adjacent to the front side of the pressing member 4 is also maintained in a state of being disposed on the portion on the more front side as compared with the retracted state.

When shifting from the writing state to the retracted state, a knocking operation of pushing the knocking member 6 toward to the front side is performed. That is, when the user pushes the knocking member 6 forward, the interlocking member 5 and the pressing member 4 move forward, the contact position between the interlocking side cam part 38 and the pressing side cam part 26 changes, and the pressing member 4 rotates around the axis of the barrel 2. Then, when the user releases his/her hand from the knocking member 6, the core member 3 pressed rearward by the elastic member (not illustrated) presses the pressing member 4 rearward, and the pressing member 4 presses the interlocking member 5 and the knocking member 6 rearward. As a result, the pressing member 4, the interlocking member 5, and the knocking member 6 move rearward. Then, the engagement position between the pressing side engagement portion 25 and the barrel side engagement portion 15 changes, and the shift to the retracted state is completed.

As illustrated in FIG. 1, the interlocking member 5 of the present embodiment is disposed in a state where a front side portion (a front side portion of the pressing material connecting part 30) is accommodated in the barrel 2 and a rear side portion protrudes rearward from the rear side opening part 12 of the barrel 2. Note that the writing utensil 1 of the present embodiment is configured so that the interlocking side engagement portion 37 of the interlocking member 5 abuts on the stepped part 14 of the barrel 2 in order to prevent the interlocking member 5 from falling off rearward. That is, the interlocking side engagement portion 37 and the stepped part 14 of the barrel 2 function as a retaining means (third movement restricting means).

Figure 9:
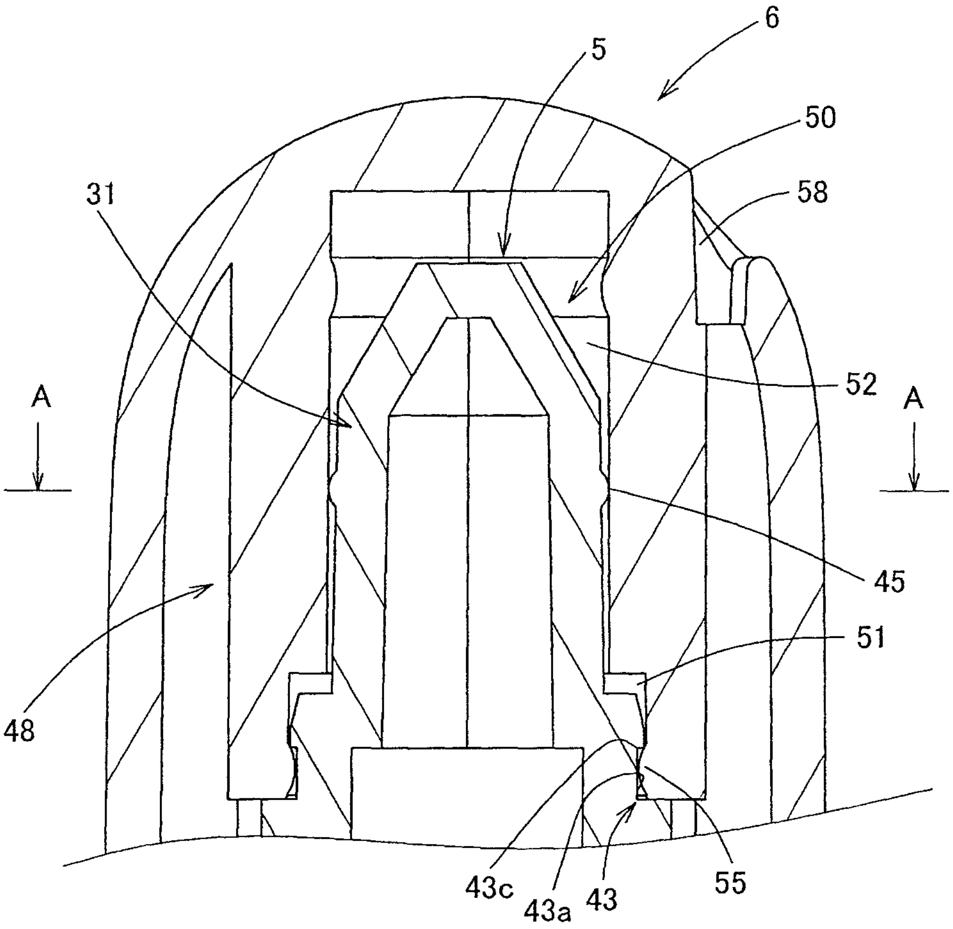
FIG. 9 is an enlarged explanatory view illustrating a state in which the interlocking member and the knocking member in FIG. 1 engage with each other.

In the present embodiment, as described above, the knocking member 6 is attached to the rear side portion of the interlocking member 5 (knocking member mounting part 31). Specifically, as illustrated in FIG. 9, the knocking member mounting part 31 is inserted into the inner cylindrical portion 48 of the knocking member 6 from the front side, and the knocking member mounting part 31 is disposed in the inner space of the inner cylindrical portion 48 (interlocking member inserting part 50).

At this time, the knocking side locking protruding part 55 of the knocking member 6 engages with the knocking member engagement portion 43 of the interlocking member 5. Specifically, the knocking side locking protruding part 55 is located outside the front side thin part 43*a*, in other words, at least a portion of the knocking side locking protruding part 55 is in a state of entering a recessed portion (narrow diameter portion) located in front of the stepped part 43*c*.

At this time, a top portion (protruding end portion) of the rotation restricting protruding part 45 is brought into close contact with the inner peripheral surface surrounding the rear side space part 52 of the inner cylindrical portion 48.

More specifically, as illustrated in FIG. 8B, a distance from the center P1 of the rear side space part 52 in a plan view to a portion in contact with the rotation restricting protruding part 45 is defined as L1. Then, as illustrated in FIG. 6B, a maximum length among the radial lengths of the portions where the rotation restricting protruding part 45 is formed is defined as L2. At this time, it is configured so that L1 is smaller (shorter) than L2/2 (½ of L2).

Note that the "center P1 of the rear side space part 52 in a plan view" is also a position along which the central axis of the writing utensil 1 passes. In this case, the "central axis of the writing utensil 1" is an imaginary line that partially coincides with the central axis of the writing utensil 1, in other words, an imaginary line (liner line) in which the central axis of the writing utensil 1 extends in the longitudinal direction. The "portion in contact with the rotation restricting protruding part 45" is a surface in contact with the rotation restricting protruding part 45, and is one side of the inner peripheral surface of the inner cylindrical portion 48 having a polygonal shape (hexagonal shape) in a plan view with the front-rear direction as the line-of-sight direction. Furthermore, in the present embodiment, the portion having the "maximum length among the radial lengths of the portions where the rotation restricting protruding part 45 is formed" is the radial length of the portion where the top of the rotation restricting protruding part 45 is located.

That is, in the writing utensil 1 according to the present embodiment, when an attempt is made to insert the rear side portion of the interlocking member 5 (the knocking member mounting part 31) into the inner cylindrical portion 48, the rear side portion cannot be inserted in a case of pressing the interlocking member 5 with a certain force or less. In the present embodiment, when the knocking member 6 is mounted to the interlocking member 5, the knocking member mounting part 31 is press-fitted into the inner cylindrical portion 48.

Here, "press-fitting" means pressing by applying pressure, and in the present embodiment, it means a strong pressing by applying a certain force or more.

Describing in detail, in a case of mounting the knocking member 6 to the interlocking member 5, when the knocking member mounting part 31 is inserted into the inner cylindrical portion 48 with a strong force, the inner cylindrical portion 48 is pushed apart by the portion where the rotation restricting protruding part 45 of the knocking member mounting part 31 is formed. That is, the inner peripheral surface of the resin-made inner cylindrical portion 48 is finely deformed so as to spread in the widening direction of the cross section, and the top portion of the rotation restricting protruding part 45 and the inner peripheral surface of the resin-made inner cylindrical portion 48 are in close contact with each other without a gap. That is, the portion where the rotation restricting protruding part 45 is formed is strongly pressed against the inner peripheral surface of the inner cylindrical portion 48, in other words, the portion where the rotation restricting protruding part 45 is formed is strongly tightened by the inner peripheral surface of the inner cylindrical portion 48.

Figure 10:
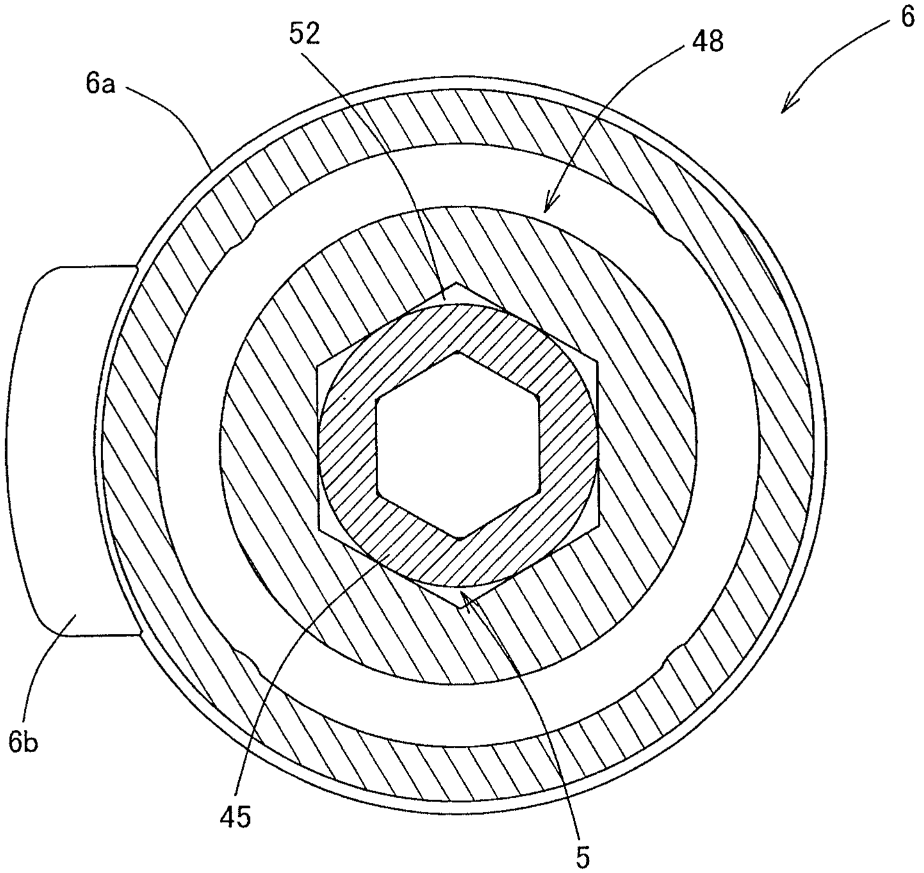
FIG. 10 is a cross-sectional view illustrating the interlocking member and the knocking member taken along the line A-A of FIG. 9.

In the present embodiment, as illustrated in FIG. 10, the inner peripheral surface surrounding the rear side space part 52 of the inner cylindrical portion 48 includes a plurality of (six) surfaces, and each portion of the rotation restricting protruding part 45 comes into contact with a portion of each of the plurality of surfaces.

At this time, as described above, the rotation restricting protruding part 45 is annularly continuous in the direction around the axis of the barrel 2 (is a direction around the axis of the central axis, and is a circumferential direction of the inner cylindrical portion 48). In the rotation restricting protruding part 45, a contact portion in contact with the inner peripheral surface of the inner cylindrical portion 48 and a non-contact portion not in contact with the inner peripheral surface of the inner cylindrical portion 48 are alternately located in the coaxial rotation direction. That is, the rotation restricting protruding part 45 is in an intermittent contact with the inner peripheral surface of the inner cylindrical portion 48 in the axial rotation direction of the barrel 2. At this time, as described above, since the rotation restricting protruding part 45 is a projection having a rounded shape without a corner and has a top portion in contact with the inner peripheral surface of the inner cylindrical portion 48, the rotation restricting protruding part 45 and the inner peripheral surface of the inner cylindrical portion 48 are in line contact with each other at the contact portion.

As a result, the writing utensil 1 according to the present embodiment is in a state in which the knocking member 6 is restricted from rotating about the barrel 2 in the axial direction when the knocking member 6 is mounted to the interlocking member 5. That is, the rotation of the knocking member 6 relative to the interlocking member 5 about the axis of the barrel 2 is restricted.

On the other hand, the writing utensil 1 of the present embodiment is configured to allow the rotation of the knocking member 6 relative to the interlocking member 5 when a certain rotational torque or more is applied to the knocking member 6. More specifically, in the writing utensil 1 of the present embodiment, a required rotational torque required for the relative rotation of the knocking member 6 relative to the interlocking member 5 is 1.0 N·cm or more and 17.0 N·cm or less.

The required rotational torque being "1.0 N·cm or more and 17.0 N·cm or less" herein means that when an operation of rotating one of the knocking member 6 and the interlocking member 5 relative to another is performed a prescribed number of times, i.e., a plurality of times, and a torque value when the knocking member 6 and the interlocking member 5 rotate relatively to each other (hereinafter, it is defined as a required rotational torque value) in each operation is measured, each required rotational torque value is "1.0 N·cm or more and 17.0 N·cm or less". That is, the average value of the required rotational torque values measured in a plurality of operations of a specified number of times is also a value of "1.0 N·cm or more and 17.0 N·cm or less".

In addition, the "operation of rotating one of the knocking member 6 and the interlocking member 5 relatively to another" is, for example, "operation of fixing the interlocking member 5 and rotating the knocking member 6 relatively to the interlocking member 5 in circumferential direction of the barrel 2". Note that it may be "operation of fixing the knocking member 6 and rotating the interlocking member 5 relatively to the knocking member 6 in the circumferential direction of the barrel 2".

In addition, the specified number of times is a number of times specified as the number of times of measurement with which the required rotational torque value can be reliably acquired, and may be, for example, three times.

As described above, in the writing utensil 1 according to the present embodiment, the interlocking member 5 of the knocking member 6 does not idle and does not rotate even when a rotational torque of less than 1.0 N·cm is applied to the knocking member 6. Thus, for example, when the writing utensil 1 is slightly rolled on a desk, the knocking member 6 does not rotate about the axis of the barrel 2. Therefore, when the writing utensil 1 is normally used, the same effect as the structure in which the knocking member 6 is prevented from rotating can be obtained. On the other hand, when the knocking member 6 is to be turned with a strong force equal to or greater than a certain level, the knocking member 6 rotates about the axis of the barrel 2, thus breakage of the knocking member 6 or the interlocking member 5 can be prevented (suppressed).

In the present embodiment, when the knocking member 6 is relatively rotated by applying the required rotational torque, the knocking member 6 can rotate by 360 degrees around the axis of the barrel 2. Specifically, in a plan view from the front with the front-rear direction as the line-of-sight direction, the knocking member 6 can rotate 360 degrees in either the clockwise direction or the counter-clockwise direction, which is the opposite direction.

That is, the knocking member 6 and the interlocking member 5 are mutually rotatable in the circumferential direction of the barrel 2, i.e., one is rotatable in the circumferential direction of the barrel 2 relatively to another, and the other is rotatable in the circumferential direction of the barrel 2 relatively to the one. In addition, the knocking member 6 and the interlocking member 5 can rotate 360 degrees in the circumferential direction of the barrel relatively to each other.

Accordingly, breakage of the knocking member 6 or the interlocking member 5 can be more reliably prevented (suppressed).

In the embodiment described above, an example has been described in which the rotation restricting protruding part 45 intermittently contacts the inner peripheral surface of the inner cylindrical portion 48 in the direction around the axis of the barrel 2. In addition, an example has been described in which the rotation restricting protruding part 45 is in line contact with the inner peripheral surface of the inner cylindrical portion 48 in the contact portion where the rotation restricting protruding part 45 and the inner peripheral surface of the inner cylindrical portion 48 are in contact with each other. However, the present disclosure is not limited thereto.

For example, it is conceivable to have a structure in which a contact portion between the rotation restricting protruding part 45 and the inner peripheral surface of the inner cylindrical portion 48 is annularly continuous in the axial rotation direction of the barrel 2. In addition, it is also conceivable to adopt a structure in which the rotation restricting protruding part 45 is in point contact with the inner peripheral surface of the inner cylindrical portion 48, such as a structure in which the rotation restricting protruding part is constituted by a plurality of hemispherical rows of projections. However, it is preferable to have the above-described structure from the viewpoint of setting the restricting force for restricting the relative rotation between the knocking member 6 and the interlocking member 5 to an appropriate amount.

Next, other embodiments of the present disclosure will be described. Note that parts similar to those in the first embodiment are denoted by the same reference numerals, and redundant description will be omitted.

Figure 11A:
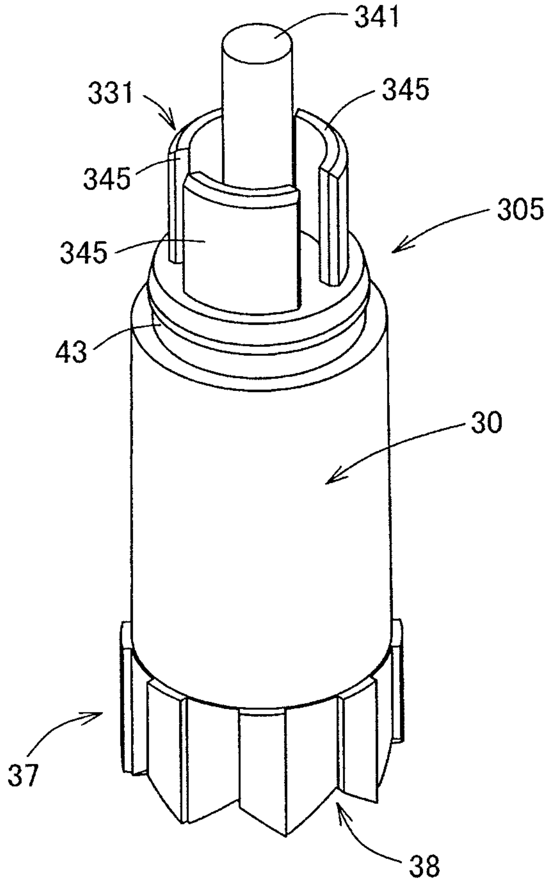
FIG. 11A is a perspective view illustrating an interlocking member adopted in a writing utensil according to a second embodiment.
Figure 11B:
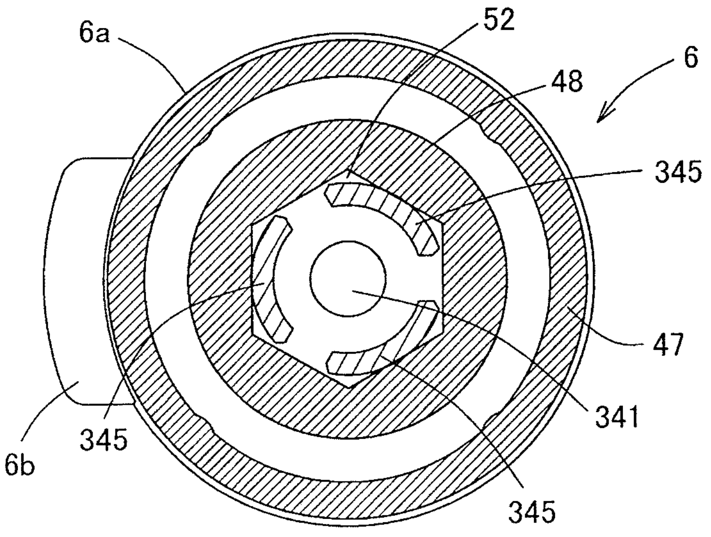
FIG. 11B is a cross-sectional view illustrating an engagement portion between the interlocking member and a knocking member adopted in the writing utensil according to the second embodiment.

As illustrated in FIGS. 11A and 11B, a retractable writing utensil according to the second embodiment of the present disclosure differs from the first embodiment in an interlocking member 305.

As illustrated in FIG. 11A, regarding the interlocking member 305, a knocking member mounting part 331 is different from the knocking member mounting part 31 described above. That is, instead of the inserting direction tip part 41, the intermediate extending part 42, and the rotation restricting protruding part 45 described above, the knocking member mounting part 331 includes a columnar part 341 and a plurality of restricting piece parts 345.

The columnar part 341 is a portion extending rearward (extending along the front-rear direction) from a rear end portion of the knocking member engagement portion 43, and is a columnar portion in the present embodiment. The columnar part 341 of the present embodiment is formed so that at least a portion thereof is located at a position through which the central axis of the writing utensil passes. Specifically, the columnar part 341 is formed so that the central axis of the columnar part 341 is located at a position through which the central axis of the writing utensil passes.

The restricting piece part 345 is a protruding piece extending rearward (extending along the front-rear direction) from a rear end portion of the knocking member engagement portion 43. That is, the restricting piece part 345 is a protruding piece extending in a cantilever manner so that the front end is a fixed end and the rear end is a free end.

The restricting piece part 345 is also a curved plate-shaped protruding piece, and has a shape curved so as to protrude outward in a widening direction (radial direction of the barrel 2 and radial direction of the columnar part 341) of the transverse cross-section of the barrel 2 in plan view. In other words, the restricting piece part 345 has a shape extending in the direction around the axis of the central axis of the writing utensil in a plan view.

Here, the interlocking member 305 is a resin member, and the restricting piece part 345 is an elastically deformable portion. That is, a free end side portion (upper end side portion) of the restricting piece part 345 is swingable in the widening direction of the transverse cross section of the barrel 2.

In the present embodiment, as illustrated in FIG. 11B, each of the plurality of restricting piece parts 345 comes into contact with the inner peripheral surface surrounding the rear side space part 52 in a natural state (state where no external force is applied). Specifically, the plurality of restricting piece parts 345 are in contact with different surfaces among a plurality of surfaces (six surfaces) constituting an inner peripheral surface having a polygonal shape (hexagonal shape) in a plan view (cross section). More specifically, in the restricting piece part 345, a top portion of a curved surface that protrudes outward in the widening direction of the transverse cross section is in contact with the inner peripheral surface.

As described above, when the knocking member 6 is rotated relatively to the interlocking member 305 with a force less than a certain value, each of the plurality of restricting piece parts 345 comes into contact with the inner peripheral surface surrounding the rear side space part 52 to prevent the relative rotation. On the other hand, when the knocking member 6 is rotated relatively to the interlocking member 305 with a certain force or more, each restricting piece part 345 is temporarily elastically deformed, and the knocking member 6 is rotated relatively to the interlocking member 305.

Figure 12A:
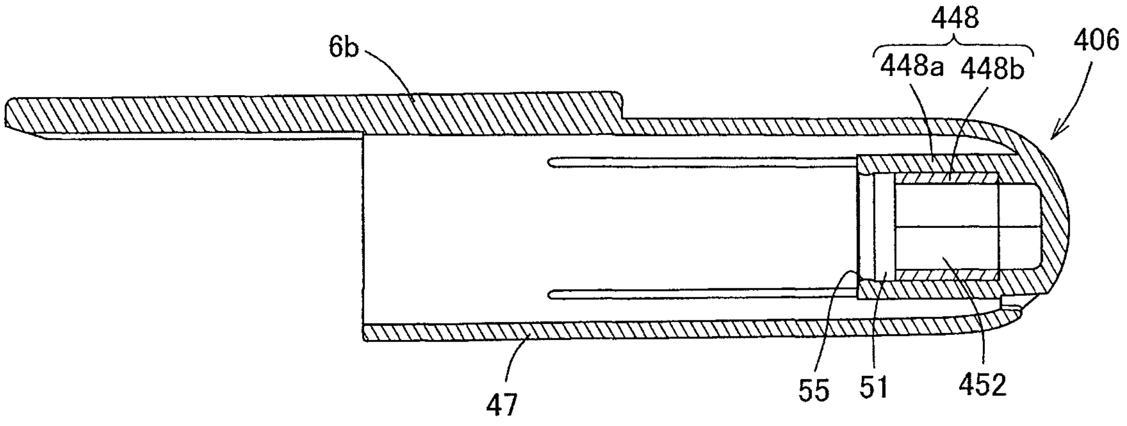
FIG. 12A is a cross-sectional view illustrating a knocking member adopted in a writing utensil according to a third embodiment.
Figure 12B:
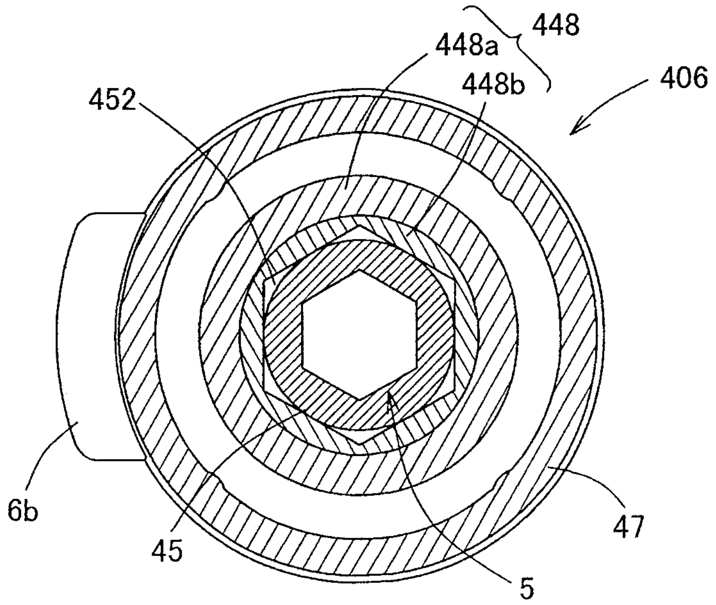
FIG. 12B is a cross-sectional view illustrating an engagement portion between an interlocking member and the knocking member adopted in the writing utensil according to the third embodiment.

As illustrated in FIGS. 12A and 12B, a retractable writing utensil according to a third embodiment of the present disclosure differs from the first embodiment in a knocking member 406.

As illustrated in FIG. 12A, the knocking member 406 includes an inner cylindrical portion 448 having a structure different from the structure of the inner cylindrical portion 48 described above. That is, the inner cylindrical portion 448 includes an inner cylinder main body part 448*a* and a high friction part 448*b*, and the inner cylinder main body part 448*a* and the high friction part 448*b* are integrally inseparably formed by an appropriate means such as two-color molding. In other words, the inner cylinder main body part 448*a* and the high friction part 448*b* cannot be separated in a non-destructive manner.

It is also conceivable that the inner cylinder main body part 448*a* and the high friction part 448*b* (high friction member) are separately formed, and the high friction part 448*b* is internally fitted to the inner cylinder main body part 448*a*.

The inner cylinder main body part 448*a* is a bottomed cylindrical portion in which an upper end portion (a right end portion in FIG. 12A) is closed.

The high friction part 448*b* is a cylindrical portion, and a cross-sectional shape (shape in a plan view) of the inner hole portion is a polygonal shape (substantially polygonal shape). In the high friction part 448*b* of the present embodiment, the cross section of the inner hole portion has a hexagonal shape (substantially hexagonal shape). The high friction part 448*b* is made of a material having a high friction coefficient such as rubber, and is made of a material having a higher friction coefficient than the material of the inner cylinder main body part 448*a*. Therefore, the high friction part 448*b* of the present embodiment is also an elastic part (elastic member) that can be elastically deformed.

In the knocking member 406 of the present embodiment, a portion of the inner peripheral surface surrounding the rear side space part 452 is formed by the inner peripheral surface of the inner hole of the high friction part 448*b*.

That is, in the knocking member 406, a portion of the inner cylindrical portion 448 is formed by the high friction part 448*b*, and a portion formed by the high friction part 448*b* is a portion having a higher friction coefficient than other portions. Thus, the portion that is at least a portion of the inner peripheral surface surrounding the rear side space part 452 and is formed by the high friction part 448*b* has a higher friction coefficient than the other portions.

In the present embodiment, as illustrated in FIG. 12B, the rotation restricting protruding part 45 intermittently contacts the inner peripheral surface formed by the high friction part 448*b* in the inner peripheral surface of the inner cylindrical portion 48 in the axial direction of the barrel 2. As a result, it is possible to improve the restricting force for restricting the rotation of the knocking member 206 relative to the interlocking member 205.

Figure 13:
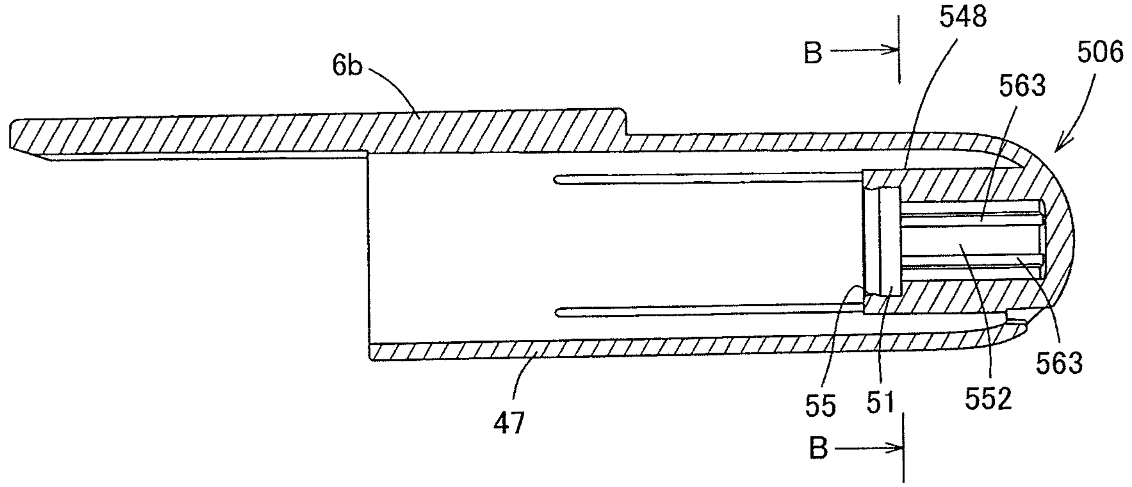
FIG. 13 is a cross-sectional view illustrating a knocking member adopted in a writing utensil according to a fourth embodiment.
Figure 14A:
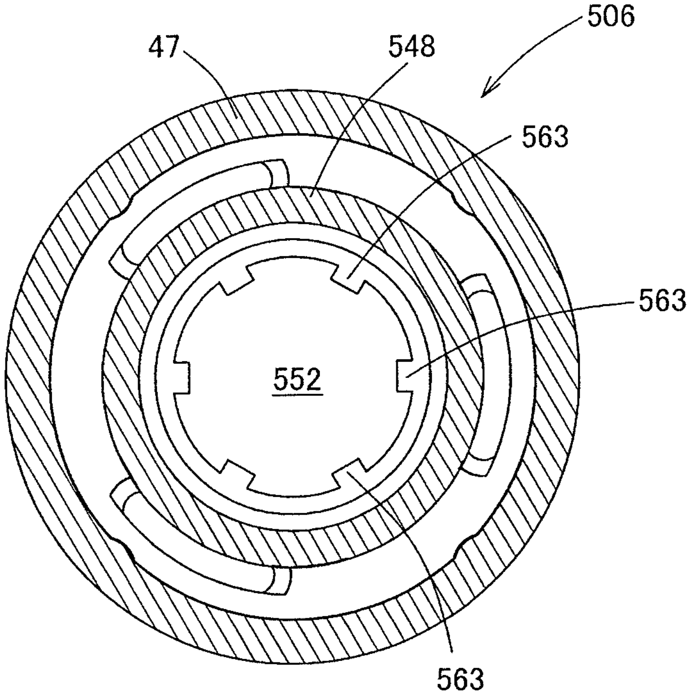
FIG. 14A is a cross-sectional view illustrating the knocking member taken along the line B-B of FIG. 13.
Figure 14B:
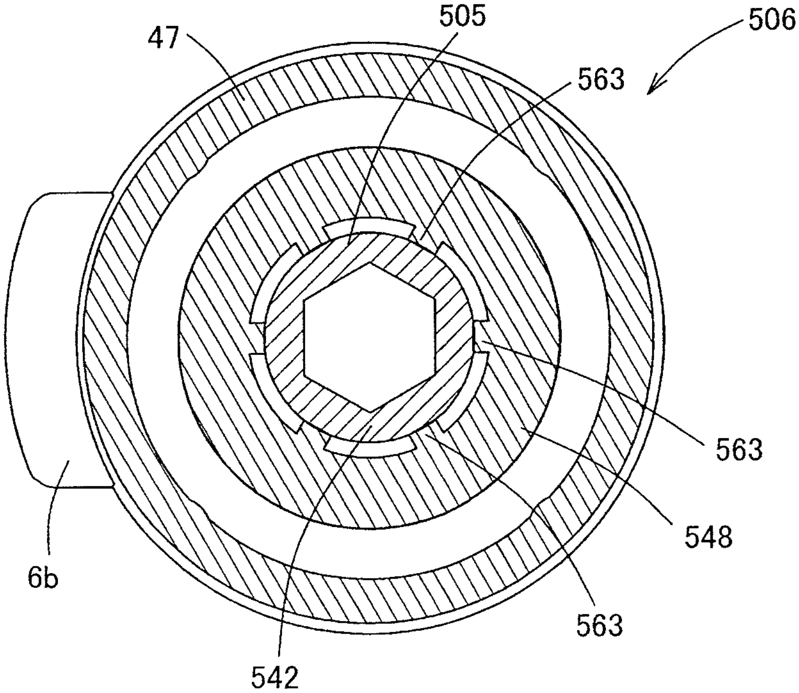
FIG. 14B is a cross-sectional view illustrating an engagement portion between an interlocking member and the knocking member adopted in the writing utensil according to the fourth embodiment.

As illustrated in FIGS. 13, 14A and 14B, a retractable writing utensil according to the fourth embodiment of the present disclosure differs from the first embodiment in an interlocking member 505 and a knocking member 506.

As illustrated in FIG. 14B, the interlocking member 505 is different from the interlocking member 5 (see FIG. 5 etc.) described above in that the rotation restricting protruding part 45 is not formed.

As illustrated in FIGS. 13 and 14A, the knocking member 506 includes an inner cylindrical portion 548 that has a different structure from that of the other embodiments. That is, a rear side space part 552 is a space in which the shape of the cross section is substantially circular and extends, and the shape of the inner peripheral surface of the inner cylindrical portion 548 surrounding the rear side space part 552 is also substantially circular in a plan view (the shape of the cross section).

In addition, a plurality of rotation restricting protrusions 563 are provided inside the inner cylindrical portion 548. Specifically, the rotation restricting protrusion 563 is formed so as to protrude inward (toward the center in the widening direction of the transverse cross section) from a portion surrounding the rear side space part 552 in the inner peripheral surface of the inner cylindrical portion 548. That is, each of the plurality of rotation restricting protrusions 563 is formed so as to protrude toward a position through which the central axis of the retractable writing utensil passes.

The rotation restricting protrusion 563 of the present embodiment has a substantially quadrangular cross-sectional shape extending in the front-rear direction. In addition, as illustrated in FIG. 14A, the plurality of rotation restricting protrusions 563 are formed so as to be arranged at intervals in the axial rotation direction of the barrel 2.

In the present embodiment, as illustrated in FIG. 14B, the plurality of rotation restricting protrusions 563 are in contact with the outer peripheral surface of the intermediate extending part 542. Specifically, different rotation restricting protrusions 563 are in contact with a plurality of different positions on the outer peripheral surface of the intermediate extending part 542 in the axial rotation direction of the barrel 2. That is, the intermediate extending part 542 intermittently contacts the knocking member 506 (the plurality of rotation restricting protrusions 563) in the circumferential direction of the barrel 2.

As described above, in the first embodiment, one rotation restricting protruding part 45 is provided on the interlocking member 5 side, and the one rotation restricting protruding part 45 is in contact with the inner peripheral surface of the inner cylindrical portion 48. On the other hand, in the present embodiment, a plurality of protruding parts (rotation restricting protrusions 563) for restricting rotation are provided on the inner cylindrical portion 548 side, and the plurality of protruding parts are in contact with the outer peripheral surface of the interlocking member 5.

Figure 15:
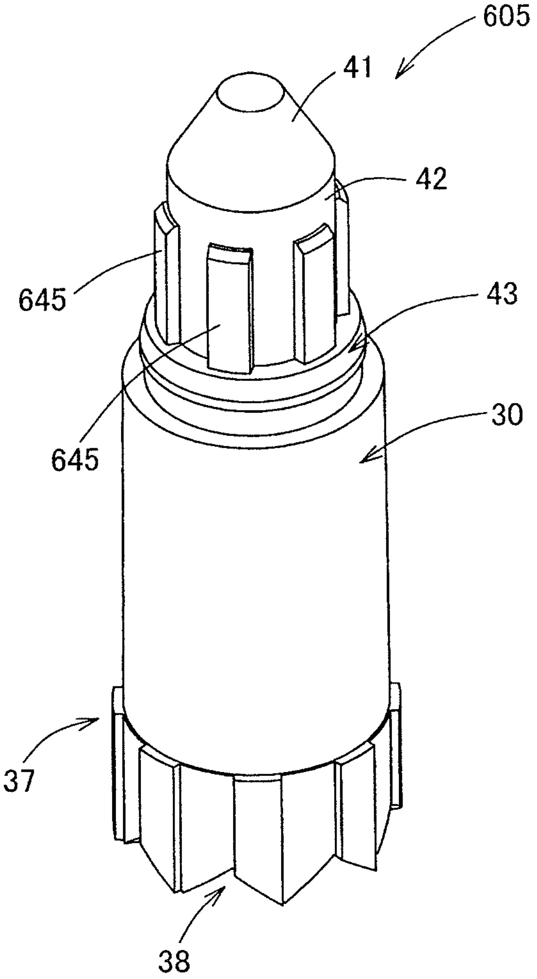
FIG. 15 is a perspective view illustrating an interlocking member employed in a writing utensil according to a fifth embodiment.
Figure 16A:
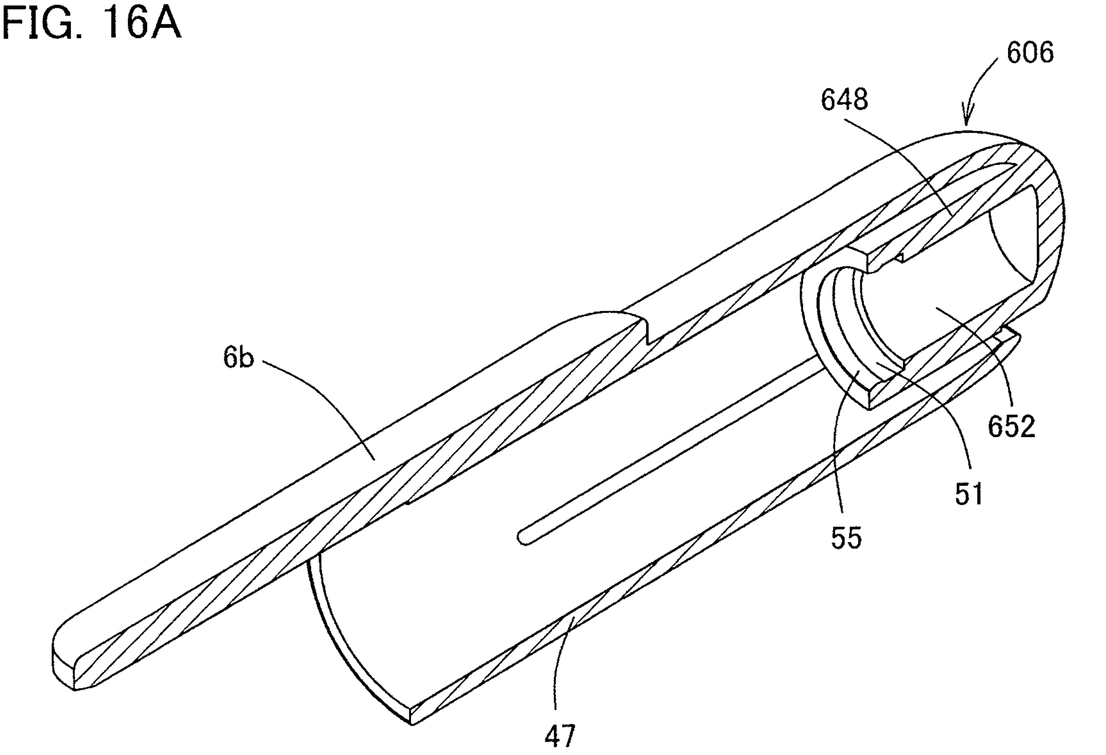
FIG. 16A is a cross-sectional perspective view illustrating a knocking member adopted in the writing utensil according to the fifth embodiment.
Figure 16B:
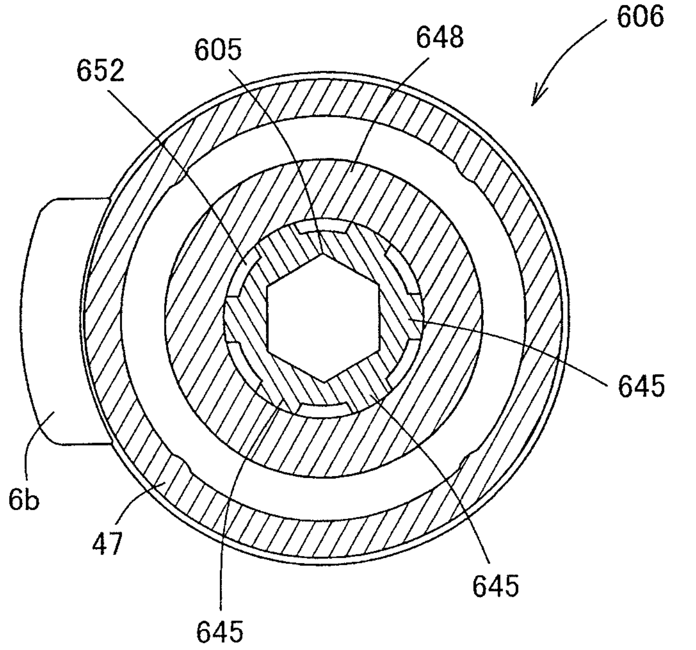
FIG. 16B is a cross-sectional view illustrating an engagement portion between the interlocking member illustrated in FIG. 15 and the knocking member illustrated in FIG. 16A.

As illustrated in FIGS. 15, 16A and 16B, a retractable writing utensil according to a fifth embodiment of the present disclosure differs from the first embodiment in an interlocking member 605 and a knocking member 606.

As illustrated in FIG. 15, the interlocking member 605 includes a plurality of rotation restricting protruding parts 645 instead of the rotation restricting protruding part 45.

The rotation restricting protruding part 645 is a projection extending in the front-rear direction, and extends while being curved in the circumferential direction of the intermediate extending part 42 (the circumferential direction of the barrel 2). That is, the outer side surface of the rotation restricting protruding part 645 in the widening direction of the transverse cross section is a curved surface protruding outward in the widening direction. In the present embodiment, the plurality of rotation restricting protruding parts 645 are formed so as to be arranged at intervals in the circumferential direction of the intermediate extending part 42.

As illustrated in FIG. 16A, the knocking member 606 is a space in which the cross-sectional shape of a rear side space part 652 extends in a substantially circular shape, and the shape of the inner peripheral surface of an inner cylindrical portion 648 surrounding the rear side space part 652 also has a substantially circular shape (cross-sectional shape) in a plan view.

In the present embodiment, as illustrates in FIG. 16B, each of the plurality of rotation restricting protruding parts 645 of the interlocking member 605 comes into contact with the inner peripheral surface surrounding the rear side space part 652. Specifically, in the inner peripheral surface surrounding the rear side space part 652, different rotation restricting protruding parts 645 are in contact with a plurality of different positions in the axial rotation direction of the barrel 2. That is, the plurality of rotation restricting protruding parts 645 which are a portion of the interlocking member 605 and the inner peripheral surface of the inner cylindrical portion 648 which is a portion of the knocking member 606 are intermittently in contact with each other in the circumferential direction of the barrel 2.

At this time, the outer side surface (the outer side surface in the widening direction of the cross section) of each rotation restricting protruding part 645 and the inner peripheral surface of the inner cylindrical portion 648 are brought into surface contact with each other.

That is, in the above described fourth embodiment, the example has been described in which the plurality of rotation restricting protrusions 563 are formed on the knocking member 506, and the plurality of rotation restricting protrusions 563 are in contact with the outer peripheral surface of a portion of the interlocking member 505 (see FIG. 14B). On the other hand, in the fifth embodiment, the plurality of rotation restricting protruding parts 645 are formed in the interlocking member 605, and the plurality of rotation restricting protruding parts 645 are in contact with the inner peripheral surface of the cylindrical portion (inner cylindrical portion 648) of the knocking member 606 (see FIG. 16B).

In the above described embodiments of the writing utensil 1, the knocking member 6 is configured to be difficult to detach from the interlocking member 5. That is, as described in FIG. 9, since the knocking side locking protruding part 55 of the knocking member 6 engages with the knocking member engagement portion 43 of the interlocking member 5, the knocking member 6 is difficult to detach from the interlocking member 5.

Further, the interlocking member 5 is difficult to detach from the pressing member 4. That is, as described in FIG. 1, the inner side locking protruding part 34 of the interlocking member 5 and the pressing side locking protruding part 27 of the pressing member 4 functions as a retaining means (first movement restricting means).

Figure 17A:
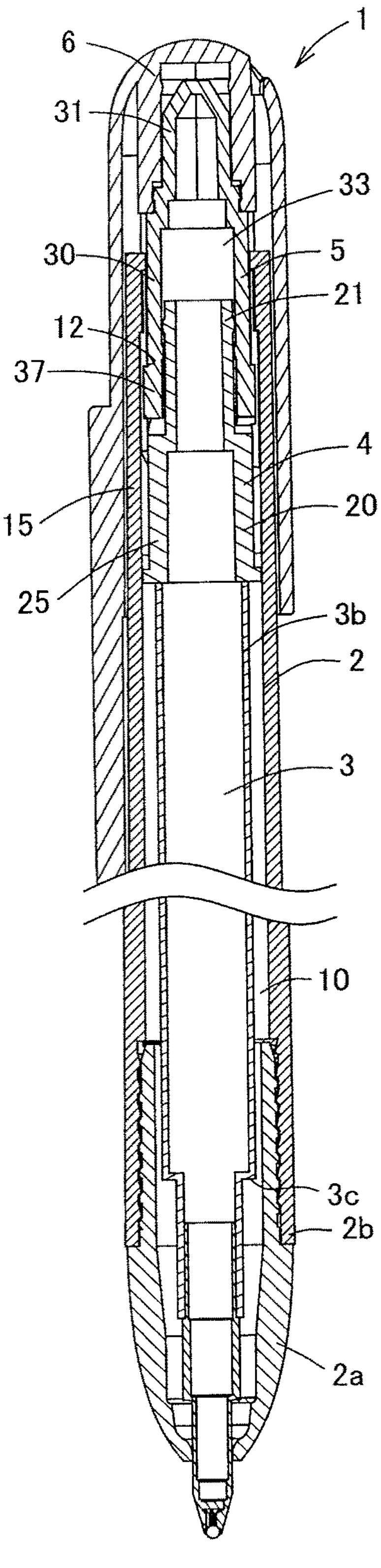
FIG. 17A is a cross-sectional view illustrating the writing utensil in a state where a tip of a core member protrudes from a tip portion of the barrel.

In addition, as described in FIG. 17A, when the pressing member 4 is pushed into a tip side of the barrel 2, the pressing member 4 is difficult to detach from the barrel 2 because the pressing side engagement portion 25 is engaged with the barrel side engagement portion 15.

As the writing utensil 1 is structured above, when the tip of the core member 3 protrudes from a tip portion of the barrel 2, the knocking member 6 is difficult to detach from the interlocking member 5. Further, the interlocking member 5 is difficult to detach from the pressing member 4, and the pressing member 4 is difficult to detach from the barrel 2.

Figure 17B:
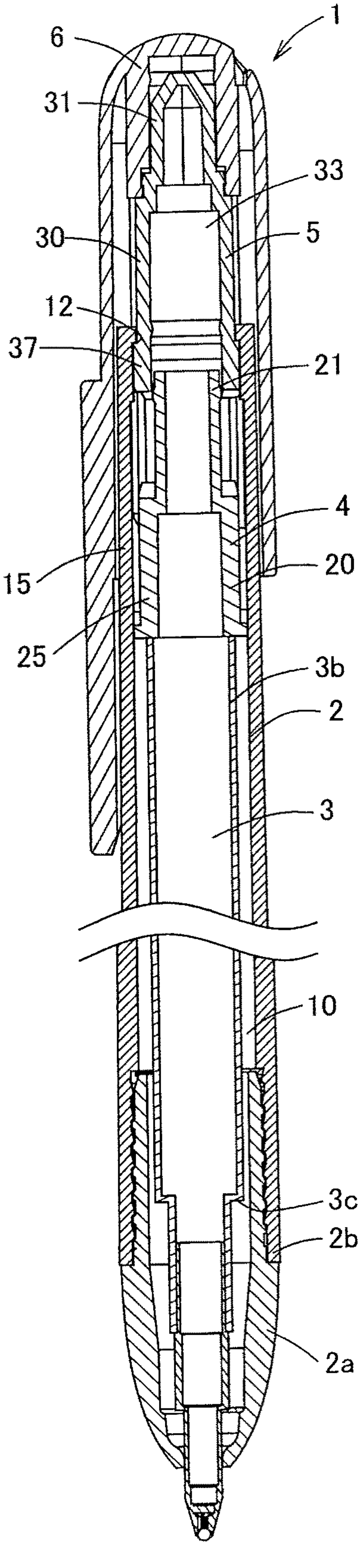
FIG. 17B is a cross-sectional view illustrating the writing utensil when a knocking member is polled with excessive force in a state of FIG. 17A

In the embodiment described here, each member has a different pull-out strength. Therefore, when the knocking member 6 is attempted to be forcibly pulled out in a state where the tip of the core member 3 protrudes from a tip portion of the barrel 2, the knocking member 6 and the interlocking member 5 are detached, as illustrated in FIG. 17B.

Thus, the knocking member 6 could be rattled without destroying the barrel 2. In addition, when the knocking member 6 and the interlocking member 5 are pushed into the barrel 2 in this state, the relationship of each member returns to the original normal state to allow the writing body to be used again.

Although the difference between pull-out strength of each member is not limited, it is desirable that the pull-out strength between the pressing member 4 and the barrel 2 should be 60 to 80 and that between the interlocking member 5 and the pressing member 4 should be 20 to 40 with assumption of the pull-out strength between the knocking member 6 and the interlocking member 5 being 100.

EXPLANATION OF REFERENCE NUMBERS

1: writing utensil (retractable writing utensil)
2: barrel
3: core member (writing body)
4: pressing member
5, 205, 305, 505, 605: interlocking member
6, 206, 406, 506, 606: knocking member
45: rotation restricting protruding part (protruding part)
50: interlocking member inserting part

The invention claimed is:

1. A retractable writing utensil comprising:
a barrel having an outer peripheral surface;
a writing body;
a knocking member that causes a portion of the writing body to protrude from or retract into a front end of the barrel with a knocking operation of pushing the knocking member forward,
the knocking member including a clip part capable of sandwiching an object to be clamped between the clip part and the outer peripheral surface of the barrel; and
an interlocking member that interlocks with the knocking member,
the interlocking member moving forward together with the knocking member and the clip part when the knocking member is pushed forward,
wherein the knocking member and the interlocking member are engaged with each other in a state allowing a restricted relative rotation of the knocking member and the interlocking member relative to each other, wherein the writing utensil includes a pressing member between the interlocking member and the writing body, and wherein the interlocking member is configured to be detached from the pressing member, wherein the pressing member includes a pressing side engagement portion configured to engage with the barrel to retain a state where the writing body protrudes from the barrel, wherein the knocking member is configured to be difficult to detach from the interlocking member, wherein the interlocking member is configured to be difficult to detach from the pressing member, wherein the pressing member is configured to engage with the barrel to make it difficult for the pressing member to detach from the barrel, wherein when the knocking member is attempted to be pulled out from the barrel with an excessive force, the interlocking member is detached from the pressing member.

2. The retractable writing utensil according to claim 1, wherein a portion of the knocking member and a portion of the interlocking member are intermittently in contact with each other in a circumferential direction of the barrel.

3. The retractable writing utensil according to claim 2, wherein contact portions between the knocking member and the interlocking member that are located at a plurality of positions separated from each other in the circumferential direction of the barrel are configured to be a point contact or a line contact.

4. The retractable writing utensil according to claim 2, wherein a required rotational torque for the relative rotation is 1.0 N·cm or more and 17.0 N·cm or less.

5. The retractable writing utensil according to claim 2, wherein the interlocking member includes a protruding part, wherein the knocking member includes an interlocking member inserting part that allows a portion of the interlocking member inclusive of the protruding part to be inserted, wherein at least a portion of the interlocking member inserting part is configured to have an inner peripheral surface with a substantially polygonal shape in a cross section, wherein the protruding part is intermittently in contact with the inner peripheral surface of the interlocking member inserting part in a circumferential direction of the barrel, and wherein a contact portion between the protruding part and the inner peripheral surface of the interlocking member inserting part is configured to be a point contact or a line contact.

6. The retractable writing utensil according to claim 2, wherein the knocking member and the interlocking member are rotatable in a circumferential direction of the barrel relatively to each other, and wherein the knocking member and the interlocking member are rotatable by 360 degrees in the circumferential direction of the barrel relatively to each other.

7. The retractable writing utensil according to claim 1, wherein a required rotational torque for the relative rotation is 1.0 N·cm or more and 17.0 N·cm or less.

8. The retractable writing utensil according to claim 1, wherein the interlocking member includes a protruding part, wherein the knocking member includes an interlocking member inserting part that allows a portion of the interlocking member inclusive of the protruding part to be inserted, wherein at least a portion of the interlocking member inserting part is configured to have an inner peripheral surface with a substantially polygonal shape in a cross section, wherein the protruding part is intermittently in contact with the inner peripheral surface of the interlocking member inserting part in a circumferential direction of the barrel, and wherein a contact portion between the protruding part and the inner peripheral surface of the interlocking member inserting part is configured to be a point contact or a line contact.

9. The retractable writing utensil according to claim 1, wherein the knocking member and the interlocking member are rotatable in a circumferential direction of the barrel relatively to each other, and wherein the knocking member and the interlocking member are rotatable by 360 degrees in the circumferential direction of the barrel relatively to each other.

* * * * *